(12) United States Patent
Diankov et al.

(10) Patent No.: US 11,488,323 B2
(45) Date of Patent: \*Nov. 1, 2022

(54) ROBOTIC SYSTEM WITH DYNAMIC PACKING MECHANISM

(71) Applicant: MUJIN, Inc., Tokyo (JP)

(72) Inventors: Rosen Nikolaev Diankov, Tokyo (JP); Denys Kanunikov, Tokyo (JP)

(73) Assignee: MUJIN, Inc., Tokyo (JP)

( \* ) Notice: Subject to any disclaimer, the term of this patent is extended or adjusted under 35 U.S.C. 154(b) by 277 days.

This patent is subject to a terminal disclaimer.

(21) Appl. No.: 16/858,536

(22) Filed: Apr. 24, 2020

(65) Prior Publication Data

US 2020/0380722 A1 Dec. 3, 2020

Related U.S. Application Data

(63) Continuation of application No. 16/428,714, filed on May 31, 2019, now Pat. No. 10,679,379.

(51) Int. Cl.
*G06T 7/73* (2017.01)
*B65G 57/22* (2006.01)
(Continued)

(52) U.S. Cl.
CPC ............... *G06T 7/75* (2017.01); *B25J 9/1679* (2013.01); *B25J 9/1687* (2013.01); *B65B 57/00* (2013.01);
(Continued)

(58) Field of Classification Search
CPC ... G06K 9/3241; G06F 16/84; G06T 2210/32; G06T 7/75; B65G 57/22; B65G 1/1378;
(Continued)

(56) References Cited

U.S. PATENT DOCUMENTS 3,586,176 A 6/1971 Rackman
4,641,271 A 2/1987 Konishi et al.
(Continued)

FOREIGN PATENT DOCUMENTS

CA 2472434 A1 10/2005
CN 1277591 A 12/2000
(Continued)

OTHER PUBLICATIONS

Non-Final Office Action dated Sep. 15, 2020 for U.S. Appl. No. 16/802,451, filed Feb. 26, 2020, 25 pages.
(Continued)

*Primary Examiner* — Thomas Randazzo
(74) *Attorney, Agent, or Firm* — Perkins Coie LLP

(57) ABSTRACT

A method for operating a robotic system includes determining a discretized object model representative of a target object; determining a discretized platform model representative of a task location; determining height measures based on real-time sensor data representative of the task location; and dynamically deriving a placement location based on (1) overlapping the discretized object model and the discretized platform model for stacking objects at the task location and (2) calculating a placement score associated with the overlapping based on the height measures.

20 Claims, 7 Drawing Sheets

(51) Int. Cl.
| | |
|---|---|
| *B65G 61/00* | (2006.01) |
| *B25J 9/16* | (2006.01) |
| *B65G 1/137* | (2006.01) |
| *B65B 57/00* | (2006.01) |
| *B65G 47/90* | (2006.01) |
| *G05B 17/02* | (2006.01) |
| *G06V 10/20* | (2022.01) |

(52) U.S. Cl.
CPC .......... *B65G 1/1378* (2013.01); *B65G 47/90* (2013.01); *B65G 57/22* (2013.01); *B65G 61/00* (2013.01); *G05B 17/02* (2013.01); *G06V 10/255* (2022.01); *B65G 2201/0267* (2013.01); *G06T 2210/32* (2013.01)

(58) Field of Classification Search
CPC ........ B65G 47/90; B65G 61/00; B25J 9/1679; B25J 9/1687; B65B 57/00; G05B 17/02; G06V 10/255
See application file for complete search history.

(56) References Cited

U.S. PATENT DOCUMENTS

| | | | |
|---|---|---|---|
| 4,676,050 A | 6/1987 | Odenthal | |
| 4,692,876 A | 9/1987 | Tenma et al. | |
| 5,079,699 A * | 1/1992 | Tuy | G06T 11/006 345/424 |
| 5,175,692 A | 12/1992 | Mazouz et al. | |
| 5,501,571 A * | 3/1996 | Van Durrett | B65G 61/00 414/21 |
| 5,908,283 A * | 6/1999 | Huang | B65G 61/00 414/21 |
| 6,055,462 A | 4/2000 | Sato | |
| 7,266,422 B1 * | 9/2007 | DeMotte | B25J 9/1687 414/801 |
| 8,290,617 B2 | 10/2012 | Ruge | |
| 9,089,969 B1 | 7/2015 | Theobald | |
| 9,102,055 B1 | 8/2015 | Konolige et al. | |
| 9,205,558 B1 | 12/2015 | Zevenbergen et al. | |
| 9,205,562 B1 | 12/2015 | Konolige et al. | |
| 9,315,344 B1 | 4/2016 | Lehmann | |
| 9,393,693 B1 | 7/2016 | Kalakrishnan et al. | |
| 9,424,470 B1 | 8/2016 | Hinterstoisser | |
| 9,457,477 B1 | 10/2016 | Rublee et al. | |
| 9,457,970 B1 | 10/2016 | Zevenbergen et al. | |
| 9,688,489 B1 | 6/2017 | Zevenbergen et al. | |
| 9,714,145 B1 | 7/2017 | Lehmann | |
| 9,866,815 B2 | 1/2018 | Vrcelj et al. | |
| 9,926,138 B1 | 3/2018 | Brazeau | |
| 10,124,489 B2 | 11/2018 | Chitta et al. | |
| 10,252,870 B2 | 4/2019 | Kimoto et al. | |
| 10,335,947 B1 | 7/2019 | Diankov et al. | |
| 10,549,928 B1 | 2/2020 | Chavez et al. | |
| 10,618,172 B1 | 4/2020 | Diankov et al. | |
| 10,647,528 B1 | 5/2020 | Diankov et al. | |
| 10,679,379 B1 * | 6/2020 | Diankov | B25J 9/1687 |
| 10,696,493 B1 | 6/2020 | Diankov et al. | |
| 10,696,494 B1 | 6/2020 | Diankov et al. | |
| 10,953,549 B2 | 3/2021 | Diankov et al. | |
| 11,077,554 B2 | 8/2021 | Arase et al. | |
| 11,319,166 B2 | 5/2022 | Diankov et al. | |
| 2002/0057838 A1 * | 5/2002 | Steger | G06V 10/7515 382/197 |
| 2003/0110102 A1 | 6/2003 | Chien et al. | |
| 2004/0120600 A1 * | 6/2004 | Cho | G06T 7/194 382/162 |
| 2005/0246056 A1 | 11/2005 | Marks et al. | |
| 2008/0030497 A1 * | 2/2008 | Hu | G06T 7/11 345/419 |
| 2008/0131255 A1 | 6/2008 | Hessler | |
| 2008/0273801 A1 * | 11/2008 | Podilchuk | G06V 10/255 382/218 |
| 2009/0069939 A1 | 3/2009 | Nagatsuka et al. | |
| 2009/0138121 A1 * | 5/2009 | Wicks | G01B 11/002 700/219 |
| 2010/0178149 A1 | 7/2010 | Fritzsche | |
| 2010/0222915 A1 | 9/2010 | Kuehnemann et al. | |
| 2010/0249989 A1 * | 9/2010 | Baldes | B65G 57/00 700/217 |
| 2011/0013809 A1 * | 1/2011 | Abe | G06V 40/10 382/115 |
| 2011/0122231 A1 * | 5/2011 | Fujieda | G06T 7/593 348/47 |
| 2013/0163879 A1 | 6/2013 | Katz et al. | |
| 2013/0282165 A1 | 10/2013 | Pankratov et al. | |
| 2013/0345870 A1 | 12/2013 | Buehler et al. | |
| 2014/0180479 A1 | 6/2014 | Argue et al. | |
| 2014/0374216 A1 | 12/2014 | Pierson et al. | |
| 2015/0073588 A1 * | 3/2015 | Priebe | B65G 57/00 700/217 |
| 2015/0166272 A1 * | 6/2015 | Pankratov | B65G 61/00 700/217 |
| 2016/0016311 A1 | 1/2016 | Konolige et al. | |
| 2016/0063309 A1 | 3/2016 | Konolige et al. | |
| 2016/0288330 A1 | 10/2016 | Konolige et al. | |
| 2016/0371850 A1 * | 12/2016 | Kwon | G06K 9/6215 |
| 2017/0080566 A1 | 3/2017 | Stubbs et al. | |
| 2017/0134680 A1 * | 5/2017 | Zhong | G01B 11/2513 |
| 2017/0246744 A1 | 8/2017 | Chitta et al. | |
| 2017/0267467 A1 * | 9/2017 | Kimoto | B65G 47/905 |
| 2018/0060765 A1 | 3/2018 | Hance et al. | |
| 2018/0065818 A1 | 3/2018 | Gondoh et al. | |
| 2018/0304468 A1 * | 10/2018 | Holz | G06T 7/75 |
| 2018/0312346 A1 | 11/2018 | Klotz et al. | |
| 2019/0039237 A1 | 2/2019 | Nakashima et al. | |
| 2019/0061151 A1 | 2/2019 | Namiki | |
| 2019/0114250 A1 * | 4/2019 | Pugh | G06F 11/3664 |
| 2019/0143504 A1 | 5/2019 | Kimoto | |
| 2019/0193956 A1 * | 6/2019 | Morland | G05B 19/416 |
| 2019/0197695 A1 * | 6/2019 | Itakura | G06V 10/443 |
| 2020/0376662 A1 | 12/2020 | Arase et al. | |
| 2020/0376670 A1 | 12/2020 | Diankov et al. | |
| 2020/0377311 A1 | 12/2020 | Diankov et al. | |
| 2020/0377312 A1 | 12/2020 | Diankov et al. | |
| 2020/0377315 A1 | 12/2020 | Diankov et al. | |
| 2021/0237274 A1 | 8/2021 | Diankov et al. | |
| 2021/0260762 A1 | 8/2021 | Arase et al. | |

FOREIGN PATENT DOCUMENTS

| | | |
|---|---|---|
| CN | 101145051 A | 3/2008 |
| CN | 201804260 U | 4/2011 |
| CN | 102556523 A | 7/2012 |
| CN | 102725703 B | 10/2012 |
| CN | 103350908 A | 10/2013 |
| CN | 103640729 A | 3/2014 |
| CN | 103988214 B | 8/2014 |
| CN | 105691717 A | 6/2016 |
| CN | 108064197 A | 5/2018 |
| CN | 207374734 U | 5/2018 |
| CN | 108748136 A | 11/2018 |
| CN | 108776879 A | 11/2018 |
| CN | 109132313 A | 1/2019 |
| CN | 109353833 A | 2/2019 |
| CN | 109359739 A | 2/2019 |
| CN | 109382822 A | 2/2019 |
| CN | 107885901 B | 2/2020 |
| CN | 112009810 A | 12/2020 |
| DE | 69221658 T2 | 9/1997 |
| DE | 10352279 A1 | 6/2005 |
| DE | 69730758 T2 | 9/2005 |
| DE | 102009011294 A1 | 9/2010 |
| DE | 102009011300 A1 | 9/2010 |
| DE | 102014005758 B4 | 10/2014 |
| DE | 102007001263 B4 | 7/2015 |
| DE | 102016013497 A1 | 5/2017 |
| DE | 102017105082 A1 | 9/2017 |
| DE | 102017122361 A1 | 3/2018 |
| DE | 112011105151 B4 | 9/2018 |
| DE | 102018006465 A1 | 2/2019 |
| DE | 2018008744 A1 | 5/2019 |

(56) References Cited

FOREIGN PATENT DOCUMENTS

| EP | 0507375 A2 | 8/1997 |
|---|---|---|
| EP | 2314425 A2 | 4/2011 |
| EP | 2769341 B1 | 6/2016 |
| EP | 3104313 A1 | 12/2016 |
| EP | 3437807 A1 | 2/2019 |
| JP | 62019963 A | 1/1987 |
| JP | H03162320 A | 7/1991 |
| JP | H04201926 A | 7/1992 |
| JP | H08118274 A | 5/1996 |
| JP | 2000168958 A | 6/2000 |
| JP | 2002154616 A | 5/2002 |
| JP | 2002154620 A | 5/2002 |
| JP | 2003104563 A | 4/2003 |
| JP | 2003335147 A | 11/2003 |
| JP | 3586639 B2 | 11/2004 |
| JP | 2004307111 A | 11/2004 |
| JP | 2005089067 A | 4/2005 |
| JP | 2007291451 A | 11/2007 |
| JP | 2017094428 A1 | 6/2017 |
| JP | 2018008824 A | 1/2018 |
| JP | 2018052691 A | 4/2018 |
| JP | 2018136896 A | 8/2018 |
| JP | 2018167950 A | 11/2018 |
| JP | 2019025618 A | 2/2019 |
| JP | 2019085213 A | 6/2019 |
| WO | 2017018113 A1 | 2/2017 |
| WO | 2018194765 A1 | 10/2018 |

OTHER PUBLICATIONS

German Patent Office Office Action dated Jul. 1, 2021 for German patent application No. 102019130635.3, 6 pages.
German Patent Office Decision to Grant dated Oct. 6, 2020 for German patent application No. 1020191130902.6, 6 pages.
KIPO Office Action dated Sep. 24, 2021 for Korean patent application No. 9-5-2021-074997218, 12 pages.
KIPO Office Action dated Sep. 24, 2021 for Korean patent application No. 9-5-2021-075180279, 5 pages.
German Patent Office Office Action dated Sep. 3, 2021 for German patent application No. 102019130639.6, 24 pages.
KIPO Office Action dated Aug. 6, 2021 for Korean patent application No. 9-5-2021-062621061, 18 pages.
German Patent Office Office Action dated Sep. 10, 2021 for German patent application No. 102019130923.9, 19 pages.
KIPO Notice of Allowance dated Sep. 29, 2021 for Korean patent application No. 9-5-2021-076720887, 2 pages.
Corrected Notice of Allowability dated Jun. 24, 2021 for U.S. Appl. No. 16/886,734, filed May 28, 2020, 7 pages.
Notice of Allowance dated Jan. 12, 2021 for U.S. Appl. No. 16/886,734, filed May 28, 2020, 13 pages.
CIPO Office Action dated Dec. 28, 2020 for Chinese patent application No. 202010221047.6, 5 pages.
JPO Office Action dated Apr. 2, 2020 for Japanese patent application No. 2019-168905, 2 pages.
JPO Office Action dated Mar. 12, 2020 for Japanese patent application No. 2019-170230, 2 pages.
JPO Office Action dated Apr. 8, 2020 for Japanese patent application No. 2019-169752, 3 pages.
Notice of Allowance dated Oct. 23, 2020 for U.S. Appl. No. 16/802,451, filed Feb. 26, 2020, 10 pages.
CIPO Notice to Grant dated Mar. 2, 2021 for Chinese patent application No. 202010221047.6, 4 pages.
JPO Notice to Grant dated Apr. 14, 2020 for Japanese patent application No. 2019-168905, 3 pages.
JPO Notice to Grant dated Apr. 2, 2020 for Japanese patent application No. 2019-170230, 3 pages.
CIPO Office Action dated Dec. 28, 2020 for Chinese patent application No. 202010221046.1, 6 pages.
CIPO Office Action dated Mar. 1, 2021 for Chinese patent application No. 202010221046.1, 5 pages.

CIPO Office Action dated Jan. 18, 2021 for Chinese patent application No. 202010221092.1, 9 pages.
CIPO Notice to Grant dated Mar. 3, 2021 for Chinese patent application No. 202010221092.1, 4 pages.
JPO Notice to Grant dated Jun. 5, 2020 for Japanese patent application No. 2019-169752, 3 pages.
Notice of Allowance dated Feb. 9, 2021 for U.S. Appl. No. 16/802,451, filed Feb. 26, 2020, 13 pages.
CIPO Office Action dated Jan. 5, 2021 for Chinese patent application No. 202010221015.6, 6 pages.
CIPO Notice to Grant dated Mar. 2, 2021 for Chinese patent application No. 202010221015.6, 4 pages.
JPO Notice to Grant dated Feb. 10, 2020 for Japanese patent application No. 2019-169842, 3 pages.
JPO Office Action dated Jan. 21, 2020 for Japanese patent application No. 2019-169842, 5 pages.
CIPO Office Action dated Jan. 13, 2021 for Chinese patent application No. 202010205099.4, 6 pages.
CIPO Notice to Grant dated Feb. 20, 2021 for Chinese patent application No. 202010205099.4, 4 pages.
JPO Notice to Grant dated Jan. 21, 2020 for Japanese patent application No. 2019-169237, 3 pages.
Non-Final Office Action dated Sep. 28, 2020 for U.S. Appl. No. 16/886,734, filed May 28, 2020, 32 pages.
CIPO Notice to Grant dated Apr. 2, 2021 for Chinese patent application No. 202010221046.1, 4 pages.
German Patent Office Office Action dated May 4, 2020 for German patent application No. 102019130043.6, 8 pages.
German Patent Office Decision to Grant dated Sep. 7, 2020 for German patent application No. 102019130043.6, 6 pages.
Non-Final Office Action dated Jul. 25, 2019 for U.S. Appl. No. 16/428,645, filed May 31, 2019, 8 pages.
Final Office Action dated Dec. 2, 2019 for U.S. Appl. No. 16/428,645, filed May 31, 2019, 8 pages.
Non-Final Office Action dated Sep. 11, 2019 for U.S. Appl. No. 16/428,714, filed May 31, 2019, 30 pages.
Notice of Allowance dated Aug. 29, 2019 for U.S. Appl. No. 16/428,809, filed May 31, 2019, 6 pages.
Notice of Allowance dated Dec. 11, 2019 for U.S. Appl. No. 16/428,809, filed May 31, 2019, 13 pages.
Non-Final Office Action dated Jul. 31, 2019 for U.S. Appl. No. 16/428,843, filed May 31, 2019, 15 pages.
Final Office Action dated Dec. 2, 2019 for U.S. Appl. No. 16/428,843, filed May 31, 2019, 7 pages.
Non-Final Office Action dated Aug. 2, 2019 for U.S. Appl. No. 16/428,870, filed May 31, 2019, 21 pages.
Notice of Allowance dated Jan. 24, 2020 for U.S. Appl. No. 16/428,870, filed May 31, 2019, 17 pages.
Notice of Allowance dated Mar. 11, 2020 for U.S. Appl. No. 16/428,645, filed May 31, 2019, 10 pages.
Notice of Allowance dated Mar. 12, 2020 for U.S. Appl. No. 16/428,714, filed May 31, 2019, 30 pages.
Notice of Allowance dated Mar. 12, 2020 for U.S. Appl. No. 16/428,843, filed May 31, 2019, 10 pages.
U.S. Appl. No. 16/804,853, filed Feb. 28, 2020, Inventors: Rosen Nikolaev Diankov and Denys Kanunikov, Applicant: MUJIN, Inc.
U.S. Appl. No. 16/874,587, filed May 14, 2020, Inventors: Rosen Nikolaev Diankov and Denys Kanunikov, Applicant: MUJIN, Inc.
U.S. Appl. No. 16/802,451, filed Feb. 26, 2020, Inventors: Rosen Nikolaev Diankov and Denys Kanunikov, Applicant: MUJIN, Inc..
U.S. Appl. No. 15/931,530, filed May 13, 2020, Inventors: Rosen Nikolaev Diankov and Denys Kanunikov, Applicant: MUJIN, Inc.
KIPO Notice of Allowance dated Aug. 6, 2021 for Korean patent application No. 10-2020-0065134, 2 pages.
German Patent Office Office Action dated Dec. 6, 2021 for German patent application No. 102019009189.2, 6 pages.
KIPO Notice of Allowance dated Mar. 23, 2022 for Korean patent application No. 10-2020-0065248, 4 pages.
KIPO Notice of Allowance dated Mar. 29, 2022 for Korean patent application No. 10-2020-0065151, 4 pages.
Non-Final Office Action dated Jan. 19, 2022 for U.S. Appl. No. 16/804,853, filed Feb. 28, 2020, 51 pages.

(56) References Cited

OTHER PUBLICATIONS

German Patent Office Office Action dated Mar. 9, 2022 for German patent application No. 102019009206.6, 6 pages.
KIPO Notice of Allowance dated Apr. 27, 2022 for Korean patent application No. 10-2020-0065143, 9 pages.
German Patent Office Decision to Grant dated Apr. 20, 2022 for German patent application No. 102019009189.2, 7 pages.
Notice of Allowance dated May 16, 2022 for U.S. Appl. No. 16/804,853, filed Feb. 28, 2020, 55 pages.

\* cited by examiner

ROBOTIC SYSTEM WITH DYNAMIC PACKING MECHANISM

CROSS-REFERENCE TO RELATED APPLICATION(S)

This application is a continuation of U.S. patent application Ser. No. 16/428,714, filed May 31, 2019, now issued as U.S. Pat. No. 10,679,379, which is incorporated by reference herein in its entirety.

This application contains subject matter related to U.S. patent application Ser. No. 16/428,645, filed May 31, 2019, now issued as U.S. Pat. No. 10,696,493, and titled "A ROBOTIC SYSTEM WITH PACKING MECHANISM," which is incorporated herein by reference in its entirety.

This application contains subject matter related to U.S. patent application Ser. No. 16/428,843, filed May 31, 2019, now issued as U.S. Pat. No. 10,696,494, and titled "ROBOTIC SYSTEM FOR PROCESSING PACKAGES ARRIVING OUT OF SEQUENCE," which is incorporated herein by reference in its entirety.

This application contains subject matter related to U.S. patent application Ser. No. 16/428,870, filed May 31, 2019, now issued as U.S. Pat. No. 10,647,528, and titled "ROBOTIC SYSTEM FOR PALLETIZING PACKAGES USING REAL-TIME PLACEMENT SIMULATION," which is incorporated herein by reference in its entirety.

TECHNICAL FIELD

The present technology is directed generally to robotic systems and, more specifically, to systems, processes, and techniques for packing objects based on dynamic computations.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

However, despite the technological advancements, robots often lack the sophistication necessary to duplicate human sensitivity and/or adaptability required for executing more complex tasks. For example, robots often lack the granularity of control and flexibility in the executed actions to account for deviations or uncertainties that may result from various real-world factors. Accordingly, there remains a need for improved techniques and systems for controlling and managing various aspects of the robots to complete the tasks despite the various real-world factors.

DETAILED DESCRIPTION

Figure 1:
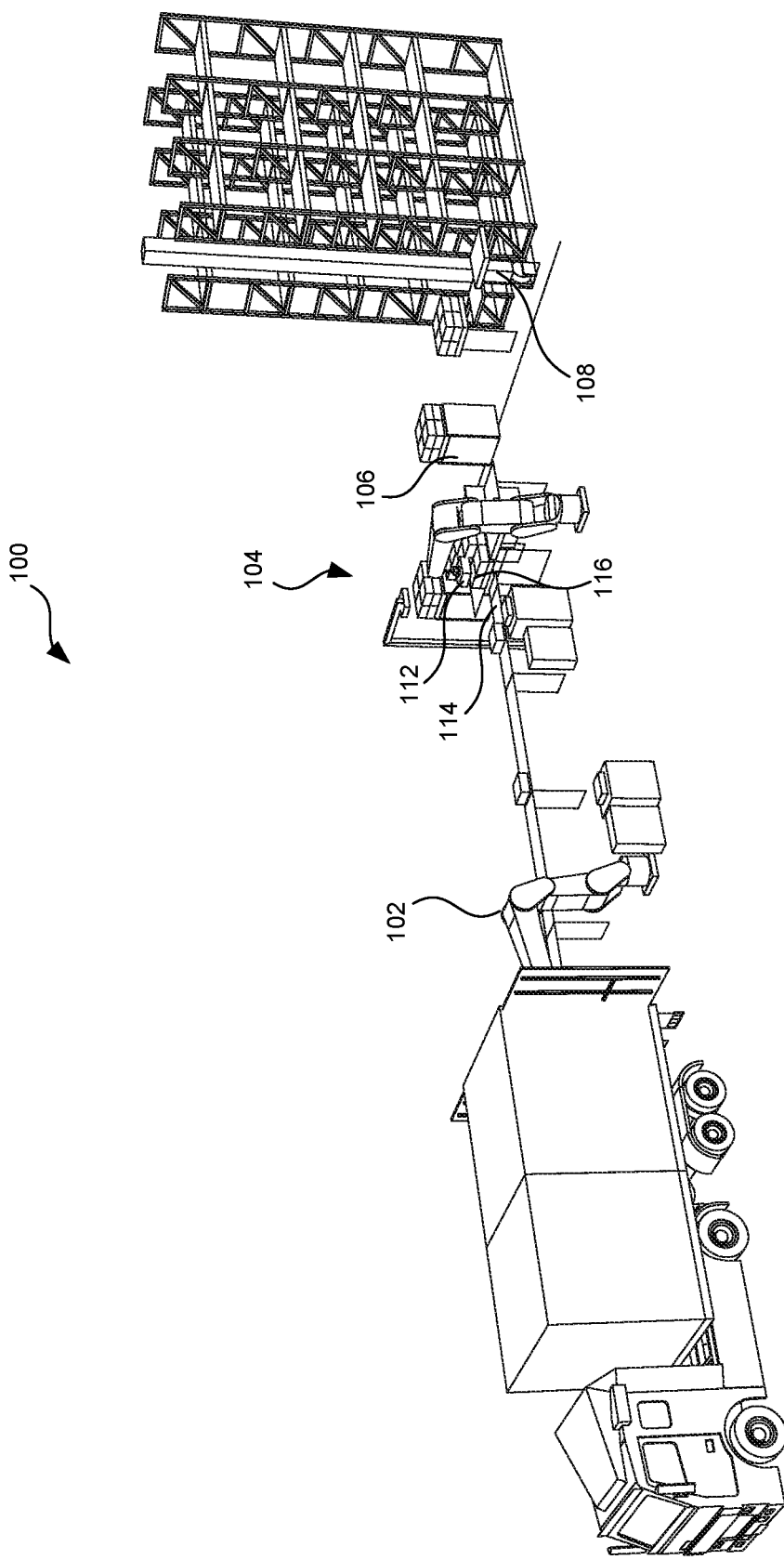
FIG. 1 is an illustration of an example environment in which a robotic system with a dynamic packing mechanism may operate.

Systems and methods for dynamically packing objects (e.g., packages and/or boxes) are described herein. A robotic system (e.g., an integrated system of devices that executes one or more designated tasks) configured in accordance with some embodiments provides enhanced packing and storage efficiency by dynamically deriving optimal storage locations for the objects and stacking them accordingly.

Traditional systems use offline packing simulators to predetermine packing sequences/arrangements. The traditional packing simulators process object information (e.g., case shapes/sizes) for a predetermined or estimated set of cases to generate packing plans. Once determined, the packing plans dictate and/or require specific placement locations/poses of the objects at destinations (e.g., pallets, bins, cages, boxes, etc.), predefined sequences for the placement, and/or predetermined motion plans. From the predetermined packing plans, the traditional packing simulators may derive source requirements (e.g., sequences and/or placements for the objects) that match or enable the packing plans. Because the packing plans are developed offline in traditional systems, the plans are independent of actual packing operations/conditions, object arrivals, and/or other system implementations. Accordingly, the overall operation/implementation will require the received packages (e.g., at the starting/pickup location) to follow fixed sequences that match the predetermined packing plans. As such, traditional systems cannot adapt to real-time conditions and/or deviations in the received packages (e.g., different sequence, location, and/or orientation), unanticipated errors (e.g., collisions and/or lost pieces), real-time packing requirements (e.g., received orders), and/or other real-time factors.

Further, because traditional systems group and pack objects according to rigid predetermined plans/sequences, they require all objects at a source location to either (1) have a same dimension/type and/or (2) arrive according to a known sequence. For example, the traditional systems would require the objects to arrive (via, e.g., conveyor) at a pickup location according to a fixed sequence. Also, for example, the traditional systems would require the objects at the pickup location to be placed at designated locations according to a predetermined pose. As such, traditional systems require one or more operations to order and/or place the objects at the source (i.e., before the packing operation) according to the predetermined sequence/arrangement. Often, the traditional systems require a sequence buffer, which costs upwards of one million U.S. dollars, to order and/or place the objects at the source according to the predetermined sequence/pose.

In contrast to the traditional systems, the robotic system described herein can dynamically (e.g., as the object arrives or is identified and/or after initially starting one or more operations, such as the actual packing operation) derive placement locations of the objects during system operation. In some embodiments, the robotic system can initiate/implement the dynamic derivation of the placement based on a triggering event, such as a re-evaluation timing, a packing/manipulation error (e.g., a collision event or a lost piece event), an unrecognized object (e.g., at the source and/or the destination), a change in locations/orientations of already-placed packages, and/or occurrence of other dynamic conditions. In some embodiments, the placement location can be dynamically derived when the robotic system lacks prior information about the arriving objects, such as for receiving previously unknown objects and/or for receiving objects in random/unknown sequences. In dynamically deriving the placement locations, the robotic system can utilize various real-time conditions (e.g., currently existing or ongoing conditions) that include, e.g., available/arriving objects, object characteristics and/or requirements, placement requirements, and/or other real-time factors.

The robotic system can derive the placement locations based on a discretization mechanism (e.g., a process, a circuit, a function, and/or a routine). For example, the robotic system can use the discretization mechanism to describe physical sizes/shapes of objects and/or target locations according to a discretization unit (i.e., one discrete area/space). The robotic system can generate discretized object profiles that use the discretization units to describe the expected objects and/or discretized destination profiles that describe the target location (e.g., surface on top of the pallet and/or a space/bottom surface inside a bin/case/box). Accordingly, the robotic system can transform continuous real-world space/area into computer-readable digital information. Further, the discretized data can allow a reduction in computational complexity for describing package footprint and for comparing various package placements. For example, package dimensions can correspond to integer numbers of discretization units, which lead to easier mathematical computations, instead of real-world decimal numbers.

In some embodiments, the robotic system can check discretized cells for the placement platform to determine object placement possibilities. For example, the robotic system can use depth measurements or heights of placed objects on the placement platform. The robotic system can determine the depth measure to determine heights at/according to the discretized cells. The robotic system can evaluate the depth measure according to groupings of the discretized cells that correspond to the object targeted for placement. The robotic system can determine the maximum height within the grouping for evaluating the placement possibilities. In other words, the robotic system can determine whether the tested placement location provides sufficient support such that the placed object can be placed relatively flat (e.g., according to predetermined thresholds and/or conditions). Details regarding the dynamic placement derivations are described below.

Accordingly, the robotic system can improve efficiency, speed, and accuracy for dynamically deriving the object placement based on the real-time conditions. For example, the system described herein can derive the placement locations when the real-world conditions present uncertainties associated with and/or deviations from anticipated conditions. As such, the robotic system can receive and pack unknown objects and/or randomly arriving (i.e., without a known/predetermined sequence) objects.

Further, the robotic system can reduce overall costs by eliminating the one or more operations, machines (e.g., sequence buffers), and/or human assistance that would be necessary in traditional systems to order or place the objects at the source and/or for the packing operation (e.g., for error handling). By dynamically deriving placement locations as the objects become available (e.g., based on object arrival and/or triggering events), the robotic system eliminates the need to reorganize or sequence the packages, along with the associated machines/human operations.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a dynamic packing mechanism may operate. The robotic system 100 can include and/or communicate with one or more units (e.g., robots) configured to execute one or more tasks. Aspects of the dynamic packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. In some embodiments, the task can include placing the objects on a target location (e.g., on top of a pallet and/or inside a bin/cage/box/case). As described in detail below, the robotic system 100 can derive individual placement locations/orientations, calculate corresponding motion plans, or a combination thereof for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start/source location 114 to a task/destination location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 2:
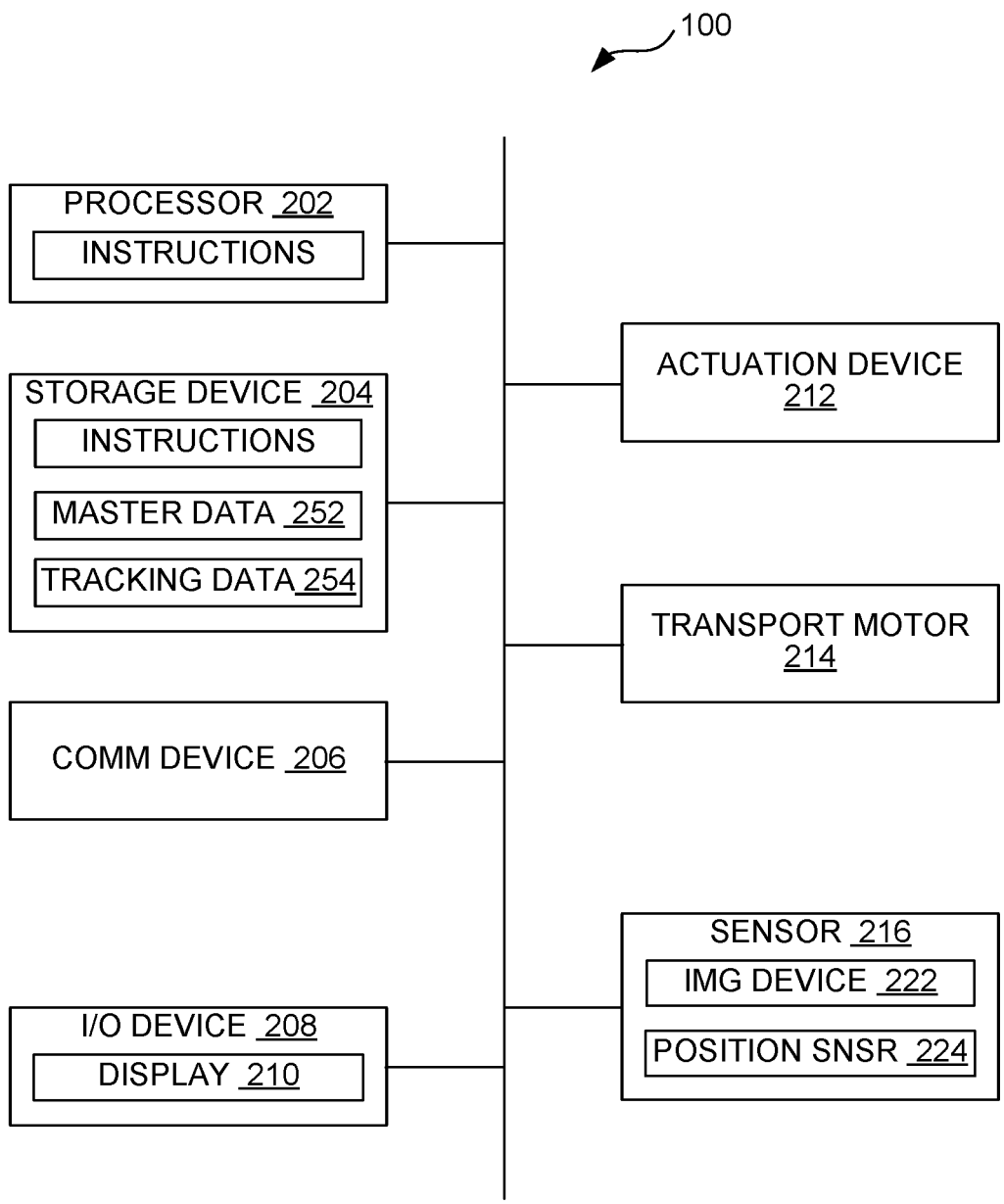
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (Wi-Fi)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location on each of the objects, expected sensor measurements (e.g., for force, torque, pressure, and/or contact measurements) corresponding to one or more actions/maneuvers, or a combination thereof. Also, for example, the storage devices 204 can store object tracking data 254. In some embodiments, the object tracking data 254 can include a log of scanned or manipulated objects. In some embodiments, the object tracking data 254 can include imaging data (e.g., a picture, point cloud, live video feed, etc.) of the objects at one or more locations (e.g., designated pickup or drop locations and/or conveyor belts). In some embodiments, the object tracking data 254 can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze image data of a designated area (e.g., a pickup location, such as inside the truck or on the conveyor belt) to identify the target object 112 and the start location 114 thereof. Similarly, the robotic system 100 can capture and analyze image data of another designated area (e.g., a drop location for placing objects on the conveyor, a location for placing objects inside the container, or a location on the pallet for stacking purposes) to identify the task location 116. For example, the imaging devices 222 can include one or more cameras configured to generate image data of the pickup area and/or one or more cameras configured to generate image data of the task area (e.g., drop area). Based on the image data, as described below, the robotic system 100 can determine the start location 114, the task location 116, the associated poses, a packing/placement location, and/or other processing results. Details regarding the dynamic packing algorithm are described below.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Discretization Models

Figures 3A, 3B:
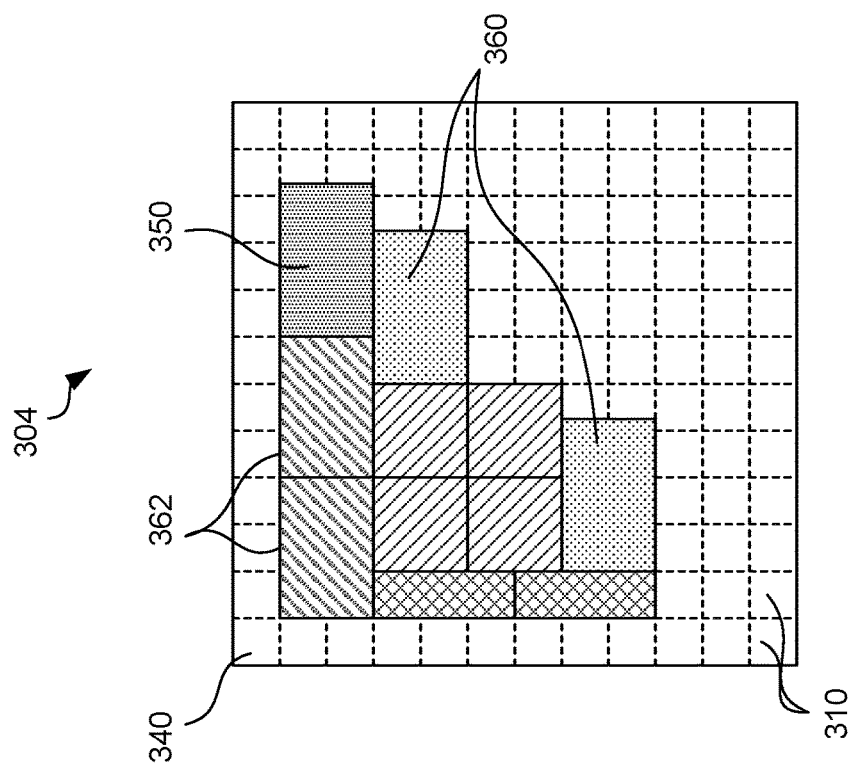
FIG. 3A is an illustration of discretized objects in accordance with one or more embodiments of the present technology.
FIG. 3B is an illustration of discretized packing platform in accordance with one or more embodiments of the present technology.

FIG. 3A and FIG. 3B are illustrations of discretized data used to plan and pack objects in accordance with one or more embodiments of the present technology. FIG. 3A illustrates discretized objects and FIG. 3B illustrates discretized packing platform for the object packing.

In some embodiments, the robotic system 100 of FIG. 1 can include predetermined discretized models/representations of the expected objects stored in the master data 252 of FIG. 2. In some embodiments, the robotic system 100 (via, e.g., the processors 202 of FIG. 2) can dynamically generate the discretized models by mapping continuous surfaces/edges of real-world objects (e.g., packages, pallets, and/or other objects associated with the task) into discrete counterparts (e.g., unit lengths and/or unit areas). For example, the robotic system 100 can discretize image data (e.g., a top view image and/or point cloud data) of the target object 112 and/or a pallet top surface captured by the one or more imaging devices 222 of FIG. 2. In other words, the robotic system 100 can discretize the image data of the start location 114 of FIG. 1, a location before the start location 114 on a conveyor, and/or the task location 116 of FIG. 1. The robotic system 100 can discretize based on identifying an outer perimeter of the object/pallet in the image data and then dividing the area within the outer perimeter according to a unit dimension/area. In some embodiments, the unit dimension/area can be scaled or mapped for the image data based on a size and/or a location of the object/pallet relative to the imaging devices 222 according to a coordinate scheme and/or a predetermined adjustment factor/equation.

As illustrated in FIG. 3A, some embodiments of the robotic system 100 can use discretized object models 302 to plan/derive placement locations of objects (e.g., the target object 112). The discretized object models 302 (shown using dotted lines) can represent exterior physical dimensions, shapes, edges, surfaces, or a combination thereof (shown using dash lines) for arriving or incoming objects (e.g., packages, boxes, cases, etc.) according to a discretization unit (e.g., a unit length). The discretized object models 302 can represent expected/known objects and/or unexpected/unknown objects that have been imaged and discretized as described above.

As illustrated in FIG. 3B, some embodiments of the robotic system 100 can use one or more discretized platform models 304 (e.g., discretized representations of the task locations 116 of FIG. 1) to plan/derive stacking placements of objects. The discretized platform models 304 can represent a placement area 340 (e.g., the physical dimension, shape, or a combination thereof of the task location 116, such as a top surface of the task location 116, a top surface of a package placed thereon, or a combination thereof) according to the discretization unit. In one or more embodiments, the discretized platform models 304 can represent real-time conditions of the placement area 340, such as via real-time updates. For example, with respect to a top view, the discretized platform models 304 can initially represent a top surface of a pallet, an inside-bottom surface of a bin or a box, etc. that is to receive and directly contact the objects. As the robotic system 100 places the objects, the placement area 340 can change to include top surfaces of the placed packages (e.g., for stacking packages) and the discretized platform model 304 can be updated to reflect the changes.

In some embodiments, the discretized platform models 304 can be based on top views of one or more standard size pallets (e.g., 1.1 m by 1.1 m pallets). Accordingly, the discretized platform models 304 can correspond to pixelated 2D representations of the placement areas along horizontal planes (e.g., the x-y planes) according to a grid system utilized by the robotic system 100. In some embodiments, the discretized object models 302 can include top views (e.g., x-y planes) of expected or arriving objects. Accordingly, the discretized object models 302 can correspond to pixelated 2D representations of the objects.

The discretization unit, used to generate discretized models, can include a length that is set by a system operator, a system designer, a predetermined input/setting, an order, or a combination thereof. In some embodiments, the robotic system 100 can use unit pixels 310 (e.g., polygons, such as squares, having one or more dimensions according to the discretization unit) to describe areas/surfaces of targeted objects (via, e.g., the discretized object models 302) and loading platforms/surfaces (via, e.g., the discretized platform models 304). Accordingly, the robotic system 100 can pixelate the objects and the loading platforms in 2D along the x-y axes. In some embodiments, the size of the unit pixels 310 (e.g., the discretization unit) can change according to dimensions of the objects and/or dimensions of the loading platforms. The size of the unit pixels 310 can also be adjusted (via, e.g., a preset rule/equation and/or operator selection) to balance required resources (e.g., computation times, required memory, etc.) with packing accuracy. For example, when the size of the unit pixels 310 decreases, the computation times and the packing accuracy can increase. Accordingly, discretization of the packing tasks (e.g., the target packages and the packing platforms) using the unit pixels 310 that are adjustable provides increased flexibility for palletizing the packages. The robotic system 100 can control a balance between the computation resources/time with the packing accuracy according to real-time demands, scenarios, patterns, and/or environments.

In some embodiments, the robotic system 100 can include for the discretized object models 302 instances of the unit pixels 310 that only partially overlap the object, such that the unit pixels 310 extend beyond the actual peripheral edges of the object. In other embodiments, the robotic system 100 can exclude partially overlapping instances of the unit pixels 310 from the discretized platform models 304 the actual dimensions of the platform surface such that the unit pixels 310 in the discretized object models 302 are overlapped and/or contained within the actual peripheral edges of the platform surface.

As an illustrative example, FIG. 3A shows a first model-orientation 332 and a second model-orientation 334 of a discretized object model representing the target object 112. In some embodiments, the robotic system 100 can rotate one of the discretized model (i.e., that is captured/stored as the first model-orientation 332) by a predetermined amount along the imaged plane. As illustrated in FIG. 3A, the robotic system 100 can rotate the discretized object model 302 about a vertical axis (extending in-out or perpendicular to the plane of the illustration) and along a horizontal plane (e.g., represented along the x and y axes) by 90 degrees for the second model-orientation 334. The robotic system 100 can use the different orientations to test/evaluate corresponding placements of the objects.

Based on the discretized data/representations, the robotic system 100 can dynamically derive a placement location 350 for the target object 112. As illustrated in FIG. 3B, the robotic system 100 can dynamically derive the placement location 350, even after one or more objects (e.g., illustrated as objects with diagonal fills in FIG. 3B) have been placed on the placement area 340. Also, the dynamic derivation of the placement location 350 can occur after/while the target object 112 is unloaded/de-shelved, registered, scanned, imaged, or a combination thereof. For example, the robotic system 100 can dynamically derive the placement location 350 as the target object 112 is transported (via, e.g., a conveyor), after the imaging devices 222 of FIG. 2 generate the image data of the target object 112, or a combination thereof.

Dynamically deriving the placement location 350 of an object provides increased flexibility and reduced human labor for shipping/packaging environments. The robotic system 100 can use discretized real-time images/depth maps of objects and the pallet (i.e., including the already-placed objects) to test and evaluate different placement locations and/or orientation. Accordingly, the robotic system 100 can still pack objects without any human operator interventions even when the object is not recognizable (e.g., for new/unexpected objects and/or computer vision errors), when an arrival sequence/order of the objects is unknown, and/or when an unexpected event occurs (e.g., a piece-loss event, and/or a collision event).

For illustrative purposes the placement location 350 is shown in FIG. 3B as being adjacent to (i.e., placed on the same horizontal layer/height as) the already-placed objects, such as directly on/contacting the pallet. However, it is understood that the placement location 350 can be on top of the already-placed objects. In other words, the robotic system 100 can derive the placement location 350 for stacking the target object 112 over and/or on top of one or more objects already on the pallet. As described in detail below, the robotic system 100 can evaluate the heights of the already-placed objects in deriving the placement location 350 to ensure that the object is sufficiently supported when stacked on top of the already-placed objects.

In some embodiments, the robotic system 100 can identify object edges 362 in deriving the placement location 350. The object edges 362 can include lines in the image data that represent edges and/or sides of the objects already placed on the pallet. In some embodiments, the object edges 362 can correspond to edges that are exposed (e.g., not directly contacting/adjacent to another object/edge), such that they define a perimeter of one or a group of objects (e.g., a layer of objects) placed on the task location 116.

As described further in detail below, the robotic system 100 can derive the placement location 350 according to a set of placement rules, conditions, parameters, requirements, etc. In some embodiments, the robotic system 100 can derive the placement location 350 based on evaluating/testing one or more candidate positions 360. The candidate positions 360 can correspond to the discretized object models 302 overlaid on top of the discretized platform models 304 at various locations and/or orientations. Accordingly, the candidate positions 360 can include potentially placing the target object 112 adjacent to one or more of the object edges 362 and/or potentially stacking target object 112 on one or more of the already-placed objects. The robotic system 100 can evaluate each of the candidate positions 360 according to various parameters/conditions, such as support measure/condition, supported weight in comparison to fragility ratings (e.g., maximum supported weight, such as for packages stacked thereon) of the supporting objects, space/packing implications, or a combination thereof. The robotic system 100 can further evaluate the candidate positions 360 using one or more placement rules, such as collision free requirement, stack stability, customer-specified rules/priorities, package separation requirements or the absence thereof, maximization of total loaded packages, or a combination thereof.

Real-Time Placement Surface Updates

Figures 4A, 4B:
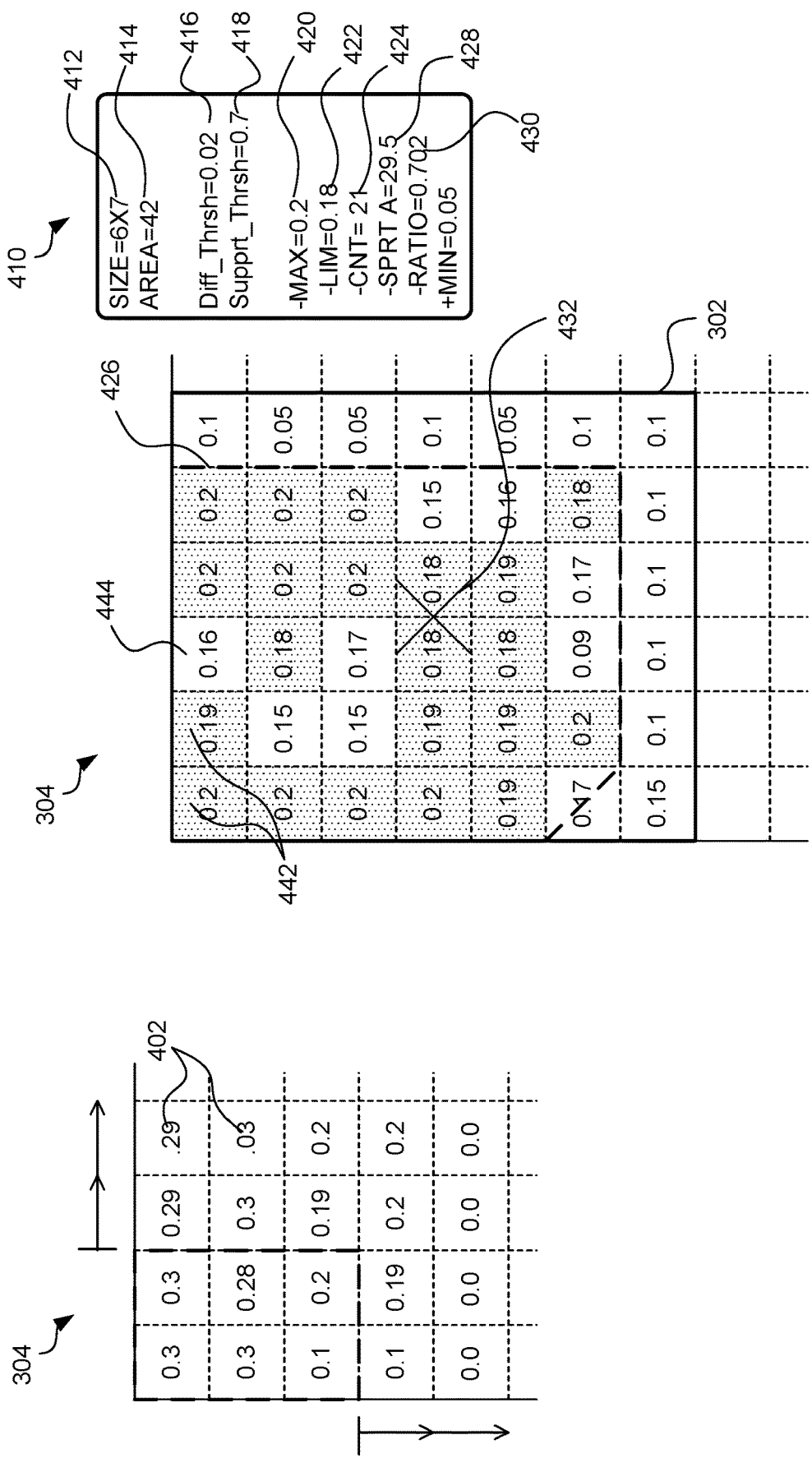
FIG. 4A is an illustration of a support computation in accordance with one or more embodiments of the present technology.
FIG. 4B is an illustration of a support metric in accordance with one or more embodiments of the present technology.

FIGS. 4A and 4B illustrate various aspects of a support computation and a support metric, in accordance with one or more embodiments of the present technology. In some embodiments, as illustrated in FIG. 4A, the robotic system 100 of FIG. 1 can generate the candidate positions 360 of FIG. 3B based on overlapping the discretized object model 302 of FIG. 3A of the target object 112 of FIG. 1 over the discretized platform model 304 of the task location 116 of FIG. 1. Further, the robotic system 100 can iteratively move the discretized object model 302 across the discretized platform model 304 in generating the candidate positions 360. For example, the robotic system 100 can generate an initial instance of the candidate position 360 by placing a corresponding discretized object model 302 according to one or more orientations (e.g., the first model-orientation 332 of FIG. 3A and/or the second model-orientation 334 of FIG. 3A) at a predetermined initial location (e.g., a corner) of the discretized platform model 304. For the next instance of the candidate position 360, the robotic system 100 can move the discretized object model 302, which corresponds to another/next object, by a predetermined distance (e.g., one or more unit pixels 310 of FIG. 3B) according to a predetermined direction/pattern.

When the candidate positions 360 overlap one or more objects already placed at the task location 116, the robotic system 100 can calculate and evaluate a measure of support provided by the already-placed objects. To calculate and evaluate the measure of support, the robotic system 100 can determine heights/contour for the placement area 340 of FIG. 3B in real-time using one or more of the imaging devices 222 of FIG. 2. In some embodiments, the robotic system 100 can use depth measures (e.g., point cloud values) from one or more of the imaging devices 222 located above the task location 116. In some embodiments, the robotic system 100 can have predetermined height/position values that correspond to vertical position of the ground and/or the platform (e.g., pallet) surface, such as a height of the platform surface above the facility ground surface. In some embodiments, the robotic system 100 can use the depth measure to calculate the heights/contour of the exposed top surface(s) of the platform, the placed objects, or a combination thereof. In some embodiments, the robotic system 100 can image the task location 116 and update the heights of the exposed top surface(s) in real-time, such as after transporting the object to and/or placing the object on the platform.

In some embodiments, as illustrated in FIG. 4A, the robotic system 100 can update the discretized platform model 304 to include height measures 402. The robotic system 100 can determine the height measures 402 according to each of the discretized pixels (e.g., the unit pixels 310) in the discretized platform model 304. For example, the robotic system 100 can determine the height measures 402 as the maximum heights for the surface portions of the placement area 340 represented by the corresponding unit pixels 310.

For each of the candidate positions 360 that overlap one or more of the already-placed objects, the robotic system 100 can evaluate the placement possibility based on the height measures 402. In some embodiments, the robotic system 100 can evaluate the placement possibility based on identifying the highest value of the height measures 402 overlapped in each of the candidate positions 360. The robotic system 100 can further identify other height measures 402 located in each of the candidate positions 360 with the height measures 402 within a limit of a difference threshold relative to the highest measure of the height measures 402. The qualifying cells/pixels can represent locations that can provide support for the stacked object such that the stacked object rests essentially flat/horizontal.

As illustrated in FIG. 4A, for the first of the candidate positions 360 (upper-left corner of the discretized platform model 304), the highest height measure can be 0.3 (i.e., 300 millimeters (mm) tall). For the difference threshold predetermined as 0.02 (representing, e.g., 20 mm), the robotic system 100 can identify the top four discretized cells/pixels as satisfying the difference threshold. The robotic system 100 can use the identified/qualifying cells/pixels to evaluate/represent the degree of support.

FIG. 4B illustrates a further example of the support computation. FIG. 4B shows one of the candidate positions 360 of FIG. 3 with the discretized object model 302 (shown using solid thicker outline) overlaid in an upper-left corner of the discretized platform model 304. The robotic system 100 can calculate/utilize various support parameters 410, which are parameters used to evaluate the candidate position 360. For example, the support parameters 410 can include discretized dimensions 412, an overlapped area 414, a height difference threshold 416, a support threshold 418, a maximum height 420, a lower height limit 422, a qualifying count 424, a set of support area outlines 426, a support area size 428, a support ratio 430, a center-of-mass (CoM) location 432, or a combination thereof.

The discretized dimensions 412 can describe physical dimensions (e.g., length, width, height, circumference, etc.) of the target object 112 of FIG. 1 according to the unit pixels 310 of FIG. 3A. For example, the discretized dimensions 412 can include quantities of the unit pixels 310 that form peripheral edges of the discretized object model 302. The overlapped area 414 can describe an area (e.g., a footprint size along the horizontal plane) occupied by the target object 112, which can similarly be represented according to the unit pixels 310. In other words, the overlapped area 414 can correspond to a quantity of the unit pixels 310 within the discretized object model 302. For the example illustrated in FIG. 4B, the target object 112 can have the discretized dimension 412 of six pixels by seven pixels, which corresponds to the overlapped area 414 of 42 pixels.

The height difference threshold 416 and the support threshold 418 can correspond to limits used to process and/or validate the candidate positions 360. The height difference threshold 416, which can be predetermined and/or adjusted by an operator and/or an order, can represent allowed deviations from another reference height (e.g., the maximum height 420 corresponding to the highest instance of the height measures 402 in the area overlapped by the discretized object model 302) for contacting and/or supporting packages placed on top. In other words, the height difference threshold 416 can be used to define a range of surface heights that can contact and/or support the package placed thereon. As such, relative to the maximum height 420, the lower height limit 422 can correspond to a lower limit for heights within the overlapped area 414 that can provide support for the stacked package. For the example illustrated in FIG. 4B, the height difference threshold 416 can be 0.02. When the maximum height 420 is 0.2, the lower height limit 422 can be 0.18. Accordingly, in placing the target object 112 at the candidate position 360, the robotic system 100 can estimate that surfaces/pixels with heights greater than 0.18 will contact and/or provide support for the target object 112.

Accordingly, in one or more embodiments, the robotic system 100 can categorize the unit pixels 310 within the overlapped area 414 according to the height difference threshold 416. For example, the robotic system 100 can categorize the unit pixels 310 having heights satisfying the height difference threshold 416 (i.e., values greater than or equal to the lower height limit 422) as supporting locations 442 (e.g., a grouping of unit pixels 310 that represent a surface capable of having objects stacked thereon, such as represented in FIG. 4B via shaded pixels). The robotic system 100 can categorize the other unit pixels 310 as unqualified locations 444 (e.g., pixels with heights lower than the lower height limit 422).

The support threshold 418 can represent a limit for evaluating the candidate positions 360 based on a sufficiency of the supporting locations 442. For example, the support threshold 418 can be for evaluating an amount, a ratio, an area, a location, or a combination thereof associated with the supporting locations 442. In some embodiments, the support threshold 418 can be used to determine whether the qualifying count 424 (e.g., an amount of the supporting locations 442) for the candidate position 360 is sufficient for supporting the target object 112.

In one or more embodiments, the support threshold 418 can be used to evaluate a supported area (e.g., the unit pixels 360 that can provide support to an object stacked thereon, as can be determined by the height threshold) associated with the supporting locations 442. For example, the robotic system 100 can determine the support area outlines 426 based on extending edges and/or determining lines that extend across or around the unqualified locations 444 to connect corners of outermost/perimeter instances of the supporting locations 442. Thus, the support area outlines 426 can exclude the unqualified locations 444. Accordingly, the support area outlines 426 can define a perimeter for the supported area based on the perimeter instances of the supporting locations 442. Since the support area outlines 426 can extend across and/or include the unqualified locations 444, the support area size 428 (e.g., a quantity of the unit pixels 310 within the supported area) can be greater than the qualifying count 424. As such, the support area size 428 effectively represents separations between the outermost edges/corners where the support is provided. Because wider supports are preferred (e.g., where portions of the support area outlines 426 are greater than the overlap area 414 of the object for reducing overhangs and/or improving stability), the support threshold 418 can correspond to a minimum number of the unit pixels 310 in the supported area (e.g., for evaluating the support area outlines 426), thereby effectively evaluating a separation between the outermost edges/corners where the support is provided.

In some embodiments, the support threshold 418 can be for evaluating the support ratio 430, which can be calculated based on comparing the qualifying count 424 and/or the support area size 428 to the overlapped area 414. For example, the support ratio 430 can include a ratio between the qualifying count 424 and the overlapped area 414 for representing horizontal stability, supported weight concentration, or a combination thereof. Also, the support ratio 430 can include a ratio between the support area size 428 and the overlapped area 414 for representing relative widths between supporting edges/corners under the target object 112.

Further, the robotic system 100 can further evaluate the candidate positions 360 based on the CoM location 432 of the target object 112. In some embodiments, the robotic system 100 can access the CoM location 432 of the target object 112 from the master data 252 of FIG. 2 and/or dynamically estimate the CoM location 432 based on gripping and/or lifting the target object 112. Once accessed/estimated, the robotic system 100 can compare the CoM location 432 to the support area outlines 426. The robotic system 100 can require the candidate position 360 to include the CoM location 432 within the support area outlines 426 and eliminate/disqualify the candidate positions 360 that fail to satisfy such requirement. In one or more embodiments, the robotic system 100 can calculate and evaluate a placement score based on separation distances (e.g., along the x and/or the y axes) between the CoM location 432 and the support area outlines 426.

The robotic system 100 can use the support parameters 410 to evaluate constraints/requirements. For example, the robotic system 100 can eliminate/disqualify the candidate positions that do not satisfy the support threshold 418, a CoM location threshold (e.g., a requirement to include the CoM location 432 within the support area outlines 426), and/or other stacking rules. Also, the robotic system 100 can use the support parameters 410 to calculate the placement scores for the candidate positions 360 (e.g., the locations that satisfy the constraints) according to predetermined weights and/or equations. As described in detail below, the robotic system 100 can use the calculated placement score to rank the candidate positions 360 according to the predetermined preferences (e.g., as reflected by the weights/equations).

Object Placement Operation

Figure 5:
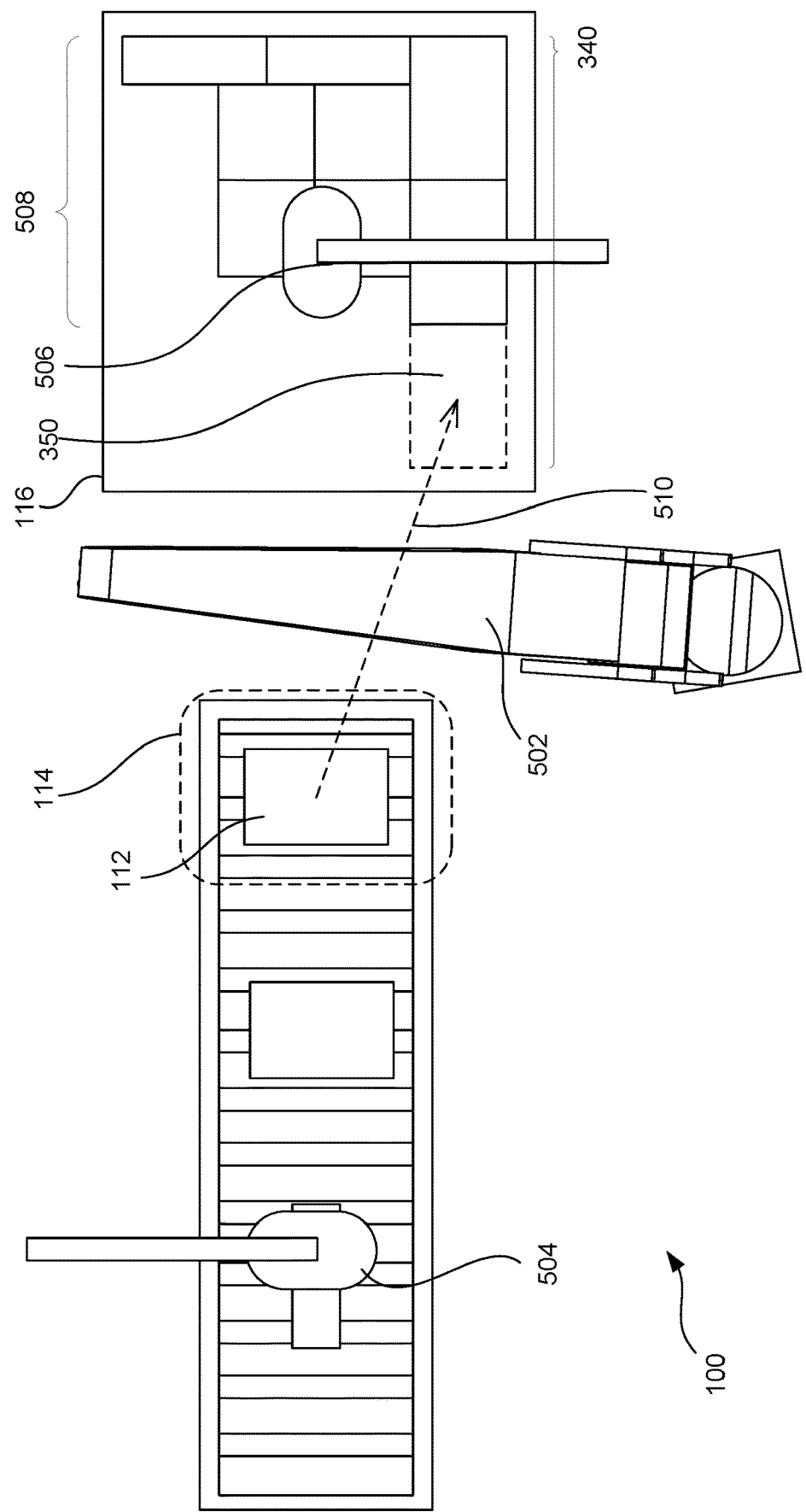
FIG. 5 is a top view illustrating an example placement executed by the robotic system in accordance with one or more embodiments of the present disclosure.

FIG. 5 is a top view illustrating an example placement executed by the robotic system 100 in accordance with one or more embodiments of the present disclosure. In some embodiments, the robotic system 100 can include and/or communicate with a robotic arm 502 (e.g., a portion of the transfer unit 104 of FIG. 1, such as a palletizing robot) configured to transfer the target object 112 from the start location 114 and place it at the derived placement location 350 at the task location 116. For example, the robotic system 100 can operate the robotic arm 502 to grip and pick up the target object 112 from a designated location/portion on a conveyor and place the target object 112 on a pallet.

The robotic system 100 can dynamically derive the placement location 350, e.g., as the target object 112 arrives at the facility and/or the start location 114 and/or after initially starting one or more operations, such as the packing operation. The robotic system 100 can dynamically derive the placement location 350 based on or to account for one or more uncertainty factors, such as an absence of a packing plan (e.g. a plan for representing placement locations 350 derived for a set of objects, including the target object 112, at the task location 116), an error in arriving objects (e.g., when the object doesn't match an expected/known object or sequence), or a combination thereof. The robotic system 100 can also dynamically derive the placement location 350 based on or to account for one or more uncertainties at the destination, such as due to previously placed objects 508 (e.g., unrecognizable and/or unexpected packages on the pallet) and/or a shift in one or more of the previously placed objects 508.

In some embodiments, the robotic system 100 can dynamically derive the placement location 350 based on data (e.g., image data and/or measurement data) dynamically gathered via one or more of the sensors 216 of FIG. 2 (e.g., the imaging devices 222 of FIG. 2). For example, the robotic system 100 can include and/or communicate with a source sensor 504 (e.g., a 3D camera) located over the start location 114 and/or an incoming path (e.g., conveyor). The robotic system 100 can use the data from the source sensor 504 to generate and/or access the discretized object models 302 of FIG. 3A. In one or more embodiments, the robotic system 100 can image the objects and/or measure one or more dimensions of the objects using the source sensor 504. The robotic system 100 can compare the images and/or the measurements to the master data 252 of FIG. 2 to identify the incoming objects. Based on the identification, the robotic system 100 can access the discretized object models 302 associated with the objects. In one or more embodiments, the robotic system 100 can dynamically generate the discretized object models 302 based on dividing the images/dimensions according to the unit pixel 310 as described above.

Also, the robotic system 100 can include and/or communicate with a destination sensor 506 (e.g., a 3D camera) located over the task location 116. The robotic system 100 can use the data from the destination sensor 506 to determine and dynamically update the discretized platform models 304 of FIG. 3B. In one or more embodiments, the robotic system 100 can image and/or measure one or more dimensions of the placement area (e.g., the task location 116, such as a pallet). The robotic system 100 can use the image and/or measurements to identify, access, and/or generate the discretized platform models 304, similarly as described above for the discretized object models 302. Further, the robotic system 100 can use the data (e.g., the depth map) from the destination sensor 506 to determine the height measures 402 of FIG. 4A. Accordingly, the robotic system 100 can use the height measures 402 to update the placement area 340 and the discretized platform models 304 in real time. For example, the robotic system 100 can update the height measures 402 according to the previously placed objects 508, such as after placing the target object 112 at the placement location 350.

The robotic system 100 can derive an approach path 510 for transferring the target object 112 to the placement location 350 and/or each of the candidate positions 360 of FIG. 3B. The approach path 510 can correspond to a motion plan for manipulating/transferring the target object 112 across space from the start location 114 to the corresponding candidate position 360. The approach path 510 can be in 3D extending across horizontal and/or vertical directions.

Approach Path Evaluation

Figure 6B:
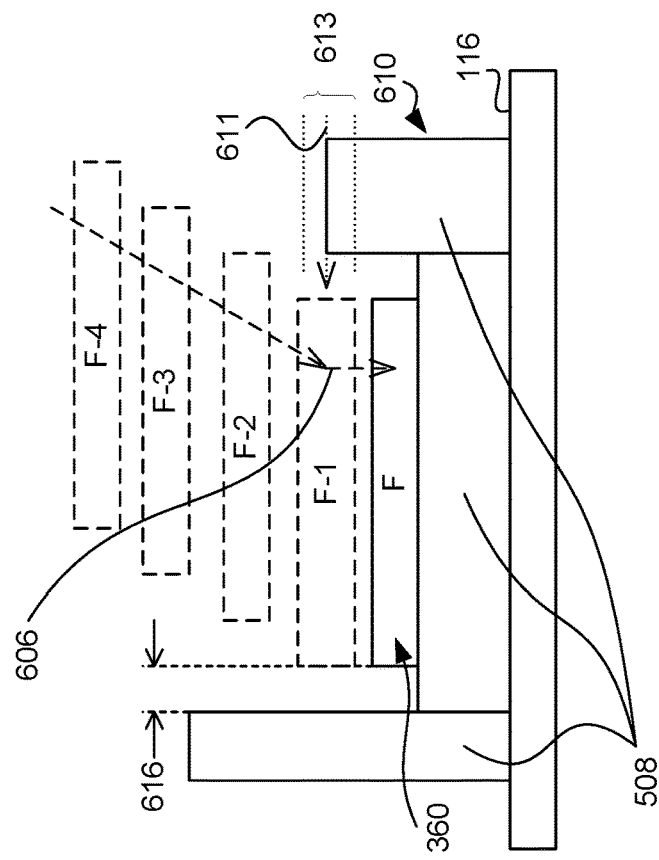
FIG. 6B is a profile view illustrating a second example approach in accordance with one or more embodiments of the present disclosure.
Figure 6A:
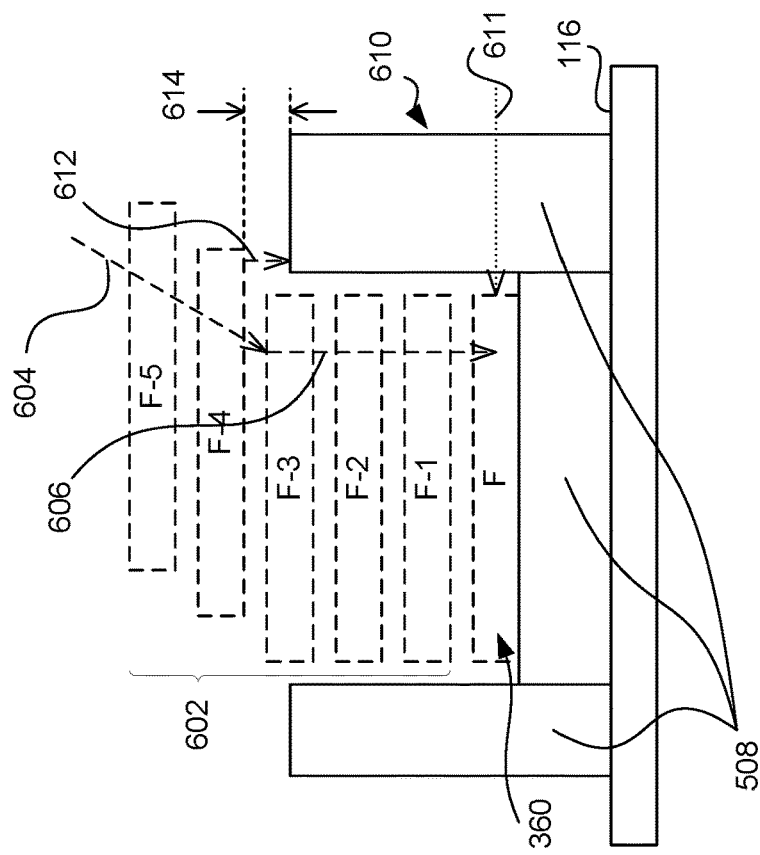
FIG. 6A is a profile view illustrating a first example approach in accordance with one or more embodiments of the present disclosure.

FIGS. 6A and 6B are profile views illustrating example approaches for placing the target object 112 of FIG. 1 in accordance with one or more embodiments of the present disclosure. FIGS. 6A and 6B illustrate the approach paths 510 of FIG. 5 for placing the target object 112 at the corresponding candidate position 360 of FIG. 3B over one of the previously placed objects 508 on the task location 116 (e.g., a pallet).

The robotic system 100 of FIG. 1 can derive the approach paths 510 based on approach increments 602, which are illustrated as the dashed boxes of F-1 to F-5. The approach increments 602 can include sequential positions of the target object 112 in 3D space along the corresponding approach path 510. In other words, the approach increments 602 can correspond to sampled positions of the target object 112 for following the corresponding approach path 510. The approach increments 602 can be aligned according to path segments 604 of the corresponding approach path 510. The path segments 604 can correspond to linear segments/directions in the approach path 510. The path segments 604 can include a final segment 606 for placing the target object 112 at the corresponding candidate position 360. The final segment 606 can include a vertical (e.g., a downward) direction.

To derive the approach paths 510, the robotic system 100 can identify any of the previously placed objects 508 that may potentially become an obstacle 610 (e.g. such as a potential obstacle when placing the target object 112 at the candidate position 360). In one or more embodiments, the robotic system 100 can identify potential obstacle(s) 610 as instance(s) of the previously placed objects 508 overlapping a horizontal line 611 (e.g., a straight line along the x-y plane) connecting the start location 114 and the corresponding candidate position 360. The robotic system 100 can further identify the potential obstacle(s) 610 as instance(s) of the previously placed objects 508 overlapping a lane 613 derived around the horizontal line, such as based on deriving the lane parallel to and overlapping the horizontal line and having a width based on one or more dimensions (e.g., a width, a length, and/or a height) of the target object 112. As illustrated in FIGS. 6A and 6B, the start location 114 can be to the right of the candidate position 360. Accordingly, the robotic system 100 can identify the previously placed object on the right as the potential obstacle 610.

In some embodiments, the robotic system 100 can validate the potential obstacle 610 based on the height measures 402 of FIG. 4A. For example, the robotic system 100 can validate/identify the potential obstacles 610 with one or more of the height measures 402 greater than or equal to those of the candidate position 360. The robotic system 100 can eliminate the previously placed objects 508 having the height measures 402 less than those of the candidate position 360 as the potential obstacles 610. In one or more embodiments, the robotic system 100 can identify/eliminate the potential obstacles 610 based on an ambiguity associated with the height of the candidate position 360 and/or the height of the potential obstacles 610.

In some embodiments, the robotic system 100 can derive the approach paths 510 in a reverse order, such as beginning from the candidate position 360 and ending at the start location 114 of FIG. 5. Accordingly, the robotic system 100 can derive the final segment 606 first (e.g., before other segments) to avoid the potential obstacles 610. For example, the robotic system 100 can determine the approach increments 602 (e.g., 'F-1' first, then 'F-2', etc.) based on iteratively increasing the height of the approach increments 602 by a predetermined distance. For each iteration, the robotic system 100 can calculate and analyze a vector 612 between the determined approach increment 602 (e.g., a bottom surface/edge thereof) and the potential obstacles 610 (e.g., a top surface/edge thereof). The robotic system 100 can continue to increase the height of the approach increments 602 until the vector 612 indicates that the determined approach increment 602 is above the potential obstacles 610 and/or clears the potential obstacles 610 by a clearance threshold 614 (e.g., a requirement for a minimum vertical separation for the target object 112 above a highest point of the potential obstacles 610 to avoid contact or collision between the target object 112 and the potential obstacle 610). When the determined approach increment 602 satisfies the clearance threshold 614 or for the following iteration, the robotic system 100 can adjust the corresponding approach increment 602 along a horizontal direction (e.g., toward the start location 114) by a predetermined distance. Accordingly, the robotic system 100 can derive the final segment 606 and/or the subsequent path segments 604 based on the candidate position 360 and the approach increment 602 that satisfied the clearance threshold 614 to derive the approach paths 510.

Once derived, the robotic system 100 can use the approach paths 510 to evaluate the corresponding candidate positions 360. In some embodiments, the robotic system 100 can calculate the placement score according to the approach paths 510. For example, the robotic system 100 can calculate the placement score according to a preference (e.g., according to one or more weights that correspond to predetermined placement preferences) for a shorter length/distance for the final/vertical segment 606. Accordingly, in comparing the approach paths 510 of FIGS. 6A and 6B, the robotic system 100 can prefer the path illustrated in FIG. 6B, which has a shorter length of the final/vertical segment 606. In one or more embodiments, the robotic system 100 can include a constraint, such as a maximum limit, associated with the approach paths 510 (e.g., for the final/vertical segment 606) used to eliminate or disqualify candidate positions 360.

In some embodiments, the robotic system 100 can further evaluate the corresponding candidate positions 360 according to other collision/obstruction related parameters. For example, the robotic system 100 can evaluate the candidate positions 360 according to horizontal separations 616 between the candidate positions 360 and one or more of the previously placed objects 508. Each of the horizontal separations 616 can be a distance (e.g., a shortest distance) along a horizontal direction (e.g., x-y plane) between the corresponding candidate position 360 and an adjacent instance of the previously placed objects 508. The robotic system 100 can calculate the placement scores for the candidate positions 360 based on the horizontal separation 616 similarly as described above for the approach paths 510. Also, the robotic system 100 can eliminate or disqualify candidate positions 360 based on the horizontal separation 616, such as when the horizontal separation 616 fails a minimum requirement. Details regarding the placement score calculation and/or the constraints for eliminating the candidate positions 360 are discussed below.

Operational Flow

Figure 7:
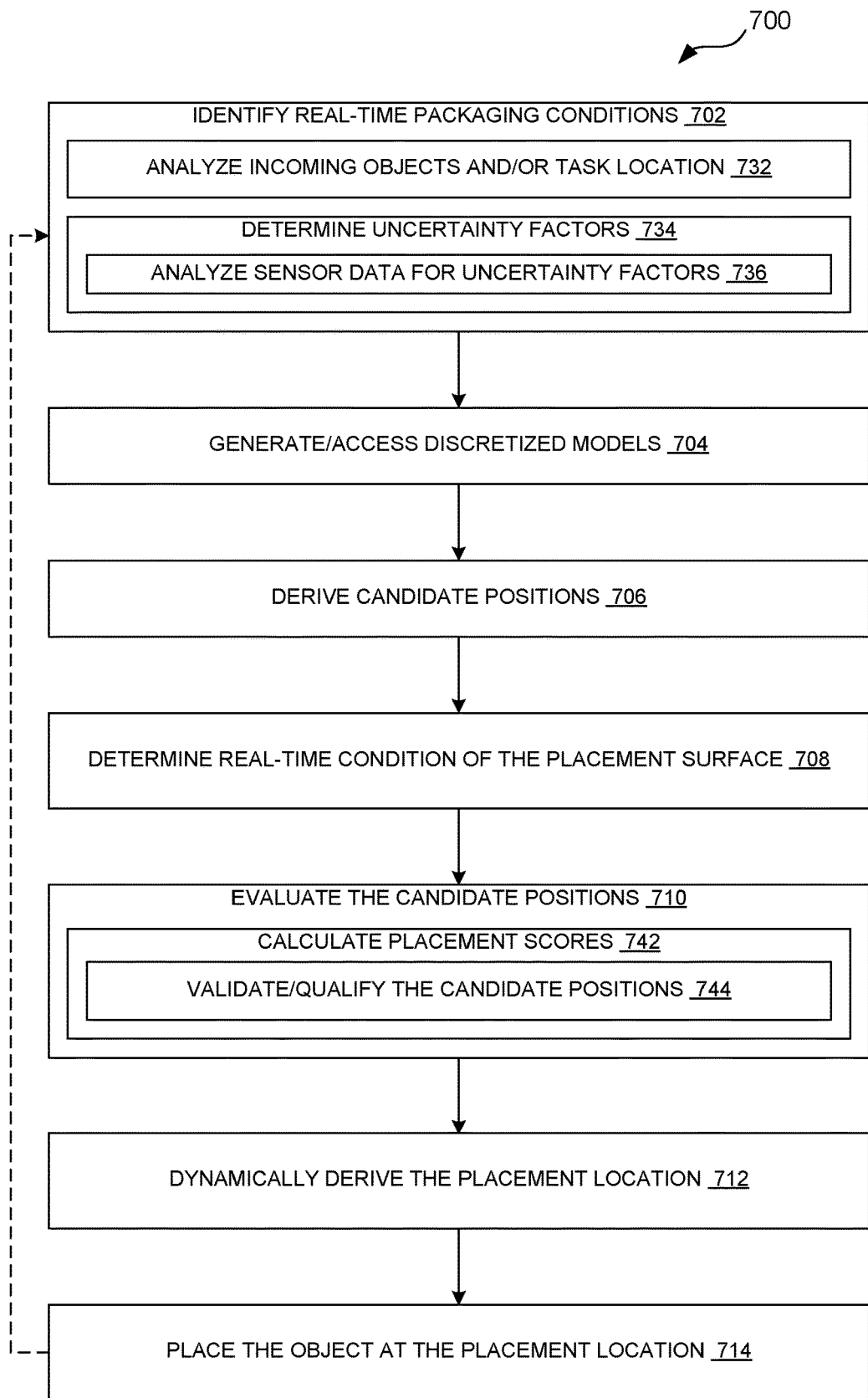
FIG. 7 is a flow diagram for operating the robotic system of FIG. 1 in accordance with one or more embodiments of the present technology.

FIG. 7 is a flow diagram for a method 700 of operating the robotic system 100 of FIG. 1 in accordance with one or more embodiments of the present technology. The method 700 can be for dynamically deriving the placement location 350 of FIG. 3B on the task location 116 of FIG. 1 for placing the target object 112 of FIG. 1. The method 700 can be implemented based on executing the instructions stored on one or more of the storage devices 204 of FIG. 2 with one or more of the processors 202 of FIG. 2.

At block 702, the robotic system 100 can identify real-time packaging conditions. For example, as illustrated at block 732, the robotic system 100 can analyze incoming objects and/or the task location 116 of FIG. 1 in real time. The robotic system 100 can receive and analyze sensor data from the sensors 216 of FIG. 2. In some embodiments, the robotic system 100 can receive (e.g., from the source sensor 504 of FIG. 5) and analyze source sensor data that represents the target object 112 of FIG. 1 that is at or approaching the start location 114 of FIG. 1. Also, the robotic system 100 can receive (e.g., from the destination sensor 506 of FIG. 5) and analyze destination sensor data representing a placement area (e.g., the placement area 340 of FIG. 3B thereon) associated with the task location 116 and/or the previously placed objects 508 of FIG. 5 thereon.

In some embodiments, such as illustrated at block 734, the robotic system 100 can analyze the sensor data to determine one or more uncertainty factors. For example, the robotic system 100 can compare the sensor data to a previously derived (via, e.g., an offline computation and/or a real-time computation at the applicable facility) packing plan that specifies placement locations for incoming objects, including the target object 112. Accordingly, some instances of the uncertainties can be based on mismatches in the sensor data and the packing plan or an associated arrival sequence.

In analyzing the sensor data for uncertainties, as illustrated at block 736, the robotic system 100 can process the sensor data (e.g., images and/or depth maps) to identify/estimate edges. For example, the robotic system 100 can process the sensor data, such as using Sobel filters, to recognize edges of the target object 112, the task location 116, the previously placed objects 508, or a combination thereof. The robotic system 100 can use the edges to identify areas that represent separate objects and/or dimensions thereof.

In some instances, the mismatches can include source matching errors resulting from comparing the source sensor data to the master data 252 of FIG. 2, an access/arrival sequence associated with the packing plan, or a combination thereof. The source matching errors can result, for example, from misidentifying (e.g., when the source sensor data does not correspond to any objects in the packing plan and/or the master data 252) the incoming object and/or from the incoming object being out of sequence and not matching the expected arrival/access sequence for the packing plan. Also, the mismatches can include destination matching errors resulting from comparing the destination sensor data to the packing plan. The destination matching errors can be caused by, for example, one or more of the previously placed objects 508 being at unanticipated locations (i.e., not matching the packing plan), such as due to a shift in the package. Other examples can include the container for the task location 116 not being fully open to receive the packages and/or having unexpected items therein upon arrival.

In one or more embodiments, the robotic system 100 can determine the uncertainties based on further triggers. For example, the robotic system 100 can determine the uncertainties based on an absence of the packing plan. Also, for example, the robotic system 100 can determine the uncertainties based on operational status or events, such as a collision event (e.g., when robotic units and/or objects collide), an object loss event (e.g., when objects are dropped during transport/manipulation), an object-shift event (e.g., when an object shifts after placement), or a combination thereof. As described in further detail below, the robotic system 100 can dynamically derive the placement location 350 of FIG. 3 for the target object 112 in response to and/or to compensate for the uncertainties.

At block 704, the robotic system 100 can generate and/or access discretized models (e.g., the discretized object models 302 of FIG. 3A and/or the discretized platform models 304 of FIG. 3B) that represent the incoming packages (including, e.g., the target object 112) and/or the task location 116, such as the pallet and/or the cage.

The robotic system 100 can determine (e.g., generate and/or access) the discretized models (e.g. discretized object model 302 and/or the discretized platform models 304) based on the real-time sensor data (e.g., the source sensor data and/or the destination sensor data). In some embodiments, the robotic system 100 can identify an object type (e.g., an identification or a category for the incoming object) for objects, such as the target object 112, based the source sensor data. The robotic system 100 can search the master data 252 to match an imaged surface to surface images corresponding to the object type in checking for the uncertainties as described above. In some embodiments, the robotic system 100 can also estimate one or more dimensions or lengths of the sensed object (e.g., the incoming object, the target object 112, the pallet, the cage, etc.) based on the sensor data (e.g., source sensor data) in checking for the uncertainties. The robotic system 100 can use the identifying information to access the discretized models stored in the storage devices of FIG. 2 and/or another device (e.g., a storage device, a database, and/or a server of a package supplier accessed via the communication devices 206 of FIG. 2). For example, the robotic system 100 can search the master data 252 using the identifying information (e.g., the surface image and/or the estimated dimensions) to find and access matching discretized models.

In some embodiments, the robotic system 100 can generate the discretized models in real time, such as directly in response to receiving the source sensor data and/or determining the uncertainties. To dynamically generate the discretized models, the robotic system 100 can divide the sensor data and/or corresponding physical dimensions (e.g., for the incoming object, the pallet top surface, etc.) according to the unit pixel 310 of FIG. 3B. In other words, the robotic system 100 can generate the discretized models based on overlaying the unit pixels 310 over an area representative of the target object 112 and/or the task location 116 according to the corresponding sensor data. The unit pixel 310 can be predetermined (by, e.g., a manufacturer, an ordering customer, and/or an operator), such as at 1 mm or 1/16 inches (in) or greater (e.g., at 5 mm or 20 mm). In some embodiments, the unit pixel 310 can be based (e.g., a percentage or a fraction) on a dimension or a size of one or more of the packages and/or the platform.

At block 706, the robotic system 100 can derive a set of candidate positions (e.g., the candidate position 360 of FIG. 3B) for placing the target object 112 at/over the task location 116. The robotic system 100 can derive the candidate positions 360 based on overlapping the discretized object model 302 of the target object 112 over the discretized platform model 304 at corresponding locations in/over the task location 116. The candidate positions 360 can correspond to locations of the discretized object models 302 along a horizontal plane and over/within the discretized platform model 304. The robotic system 100 can derive the candidate positions 360 overlapping and/or adjacent to the previously placed objects 508.

In some embodiments, the robotic system 100 can iteratively determine the locations of the discretized object model 302 based on determining an initial placement location (e.g., a predetermined location for an instance of the candidate position 360, such as a designated corner of the placement area). The robotic system 100 can determine subsequent candidate positions 360 according to a predetermined direction for deriving the next candidate positions 360, a separation requirement between the candidate positions 360 across iterations, a rule/condition governing the placement, a limit on the total number of the candidate positions 360, one or more patterns thereof, or a combination thereof. Further, the robotic system 100 can include a set of preferences and/or rules for determining the candidate positions 360 relative to the previously placed objects 508. For example, the robotic system 100 can be configured with preferences toward (e.g., for performing the function earlier than most other types/categories of the candidate position 360) determining the candidate positions 360 where the discretized object model 302 is adjacent to or abutting one or more edges of the previously placed objects 508 and/or a peripheral boundary/edge of the placement area 340. Also, the robotic system 100 can be configured with preferences toward determining the candidate positions 360 where the discretized object model 302 is over the previously placed objects 508 and fits within one of the objects and/or overlaps with one or more edges of the objects.

The robotic system 100 can derive the candidate positions 360 according to predetermined rules, patterns, limits, and/or sequences for placing the discretized object model 302. For example, the robotic system 100 can derive the candidate positions 360 based on a preference for the object edges, such as adjacent to and/or within a predetermined distance limit from outer-most edges of the previously placed objects 508. Also, the robotic system 100 can derive the candidate positions 360 based on a preference for outer edges/borders for the placement area 340, such as where the discretized object model 302 is nearest to or abuts the borders/edges of the pallet, cage, etc. Also, the robotic system 100 can derive the candidate positions 360 overlapping the previously placed objects 508.

At block 708, the robotic system 100 can determine/update real-time conditions of the placement area 340 of FIG. 3B, such as for 3D stacking evaluations. For example, the robotic system 100 can use the destination sensor data to determine the height measures 402 of FIG. 4. The robotic system 100 can use the depth measures derived from the destination sensor data and known height of the task location 116 and/or the sensor to calculate heights of the top surface(s) at the task location 116. The robotic system 100 can match the calculated heights to the unit pixels 310 in the discretized platform model 304 and assign the maximum calculated height within the unit pixel 310 as the corresponding height measure 402. In some embodiments, the robotic system 100 can determine the height measures 402 for the unit pixels 310 overlapped by the discretized object model 302 in the candidate positions 360.

At block 710, the robotic system 100 can evaluate the candidate positions 360. In some embodiments, the robotic system 100 can evaluate the candidate positions 360 according to real-time conditions, processing results, predetermined rules and/or parameters, or a combination thereof. For example, the robotic system 100 can evaluate the candidate positions 360 based on calculating corresponding placement scores, validating/qualifying the candidate positions 360, or a combination thereof.

At block 742, the robotic system 100 can calculate the placement score for each of the candidate positions 360. The robotic system 100 can calculate the placement score according to one or more of the placement conditions. For example, the robotic system 100 can use placement preferences (via, e.g., multiplier weights) and/or equations to describe preferences for: separation distances between packages, differences in package dimensions/fragility ratings/package weights for horizontally adjacent packages, the collision probabilities (based on, e.g., the approach paths 510 of FIG. 5 or a characteristic thereof and/or the horizontal separation 616 of FIG. 6), continuous/adjacent surfaces at the same height, a statistical result thereof (e.g., average, maximum, minimum, standard deviation, etc.), or a combination thereof. Other examples of the placement preferences can include a resulting height, a proximity measure, an edge-placement status, a maximum supportable weight, the object type, a supported weight ratio, or a combination thereof. Accordingly, in some embodiments, the robotic system 100 can include the processing weights/multipliers that represent preferences for lower maximum heights, for placing the target object 112 nearby a border of an already placed object or an edge of the placement platform, for minimizing a difference between heights and/or maximum supportable weights of adjacent objects, for reducing a ratio between supported weight and maximum supportable weight for objects overlapped by the target object 112, for matching object types for adjacent objects, or a combination thereof. Each placement location can be scored according to the preference factors and/or the equations that are predefined by a system manufacturer, an order, and/or a system operator.

In some embodiments, for example, the robotic system 100 can calculate the placement scores based on support measures for the candidate positions 360. The robotic system 100 can calculate the amount of support (e.g., in stacking objects) for one or more of the candidate positions 360 at least partially based on the height measures 402. As an illustrative example, the robotic system 100 can calculate the amount of support based on identifying the maximum height 420 of FIG. 4B for each of the candidate positions 360. Based on the maximum height 420 and the height difference threshold 416 of FIG. 4B, the robotic system 100 can calculate the lower height limit 422 of FIG. 4B for each of the candidate positions 360. The robotic system 100 can compare the height measures 402 of the candidate positions 360 to the corresponding lower height limits 422 to identify the supporting locations 442 of FIG. 4B for each of the candidate positions 360. The robotic system 100 can calculate the placement score for each of the candidate positions 360 based on the qualifying count 424 of FIG. 4B of the corresponding supporting locations 442.

In one or more embodiments, the robotic system 100 can calculate the placement scores based on deriving the support area outlines 426 of FIG. 4B for the candidate positions 360. As described above, the robotic system 100 can derive the set of the support area outlines 426 for each of the candidate positions 360 based on extending outer edges and/or connecting corners of outermost/peripheral instances of the supporting locations 442 in the corresponding position. Based on the supporting locations 442, the robotic system 100 can determine the support area size 428 of FIG. 4B and/or the support ratio 430 of FIG. 4B for calculating the placement score. Also, the robotic system 100 can calculate a lowest separation distance between the CoM location 432 and the support area outlines 426. The robotic system 100 can use the support area size 428, the support ratio 430, the lowest separation distance, corresponding preference weights, or a combination thereof to calculate the placement score for the corresponding candidate position.

In one or more embodiments, the robotic system 100 can calculate the placement scores based on deriving the approach paths 510 for the candidate positions 360 as described above. The robotic system 100 can calculate the placement score for each of the candidate positions 360 according to the final segment 606 of FIG. 6 (e.g., a length thereof), a quantity/length of one or more path segments 604 of FIG. 6, or a combination thereof. In some embodiments, the robotic system 100 can calculate the placement scores based on the horizontal separation 616 of FIG. 6 for the candidate positions 360.

In some embodiments, as illustrated at block 744, the robotic system 100 can qualify the candidate positions 360. The robotic system 100 can qualify the candidate positions 360 based on dynamically deriving a validated set of the candidate positions 360 according to one or more placement constraints. In deriving the validated set, the robotic system 100 can eliminate or disqualify instances of the candidate positions 360 that violate or fail to satisfy one or more of the placement constraints that are, at least partially, associated with the height measures 402. In one or more embodiments, the robotic system 100 can derive the validated set first and then calculate the placement scores for the validated set. In one or more embodiments, the robotic system 100 can derive the validated set concurrently with calculating the placement scores.

In one or more embodiments, the placement constraints can be associated with comparing the qualifying count 424, the set of support area outlines 426, the support area size 428, the support ratio 430, the CoM location 432, the approach paths 510, the horizontal separation 616, or a combination thereof to a threshold (e.g., the support threshold 418 of FIG. 4B) or a requirement. For example, the robotic system 100 can derive the validated set to include positions with the qualifying count 424, the support area size 428, and/or the support ratio 430 satisfying/exceeding a corresponding threshold. Also, the robotic system 100 can derive the validated set to include the positions having the CoM location 432 within/surrounded by the support area outlines 426 and/or satisfying a minimum separation distance from the support area outlines 426. Also, the robotic system 100 can derive the validated set to include the positions having the approach path 510 (e.g., the final segment 606 therein) satisfying a maximum length threshold and/or having the horizontal separation 616 satisfying a minimum threshold.

At block 712, the robotic system 100 can dynamically derive the placement location 350 for placing the target object 112 over/at the task location 116. The robotic system 100 can dynamically derive the placement location 350 based on selecting one of the positions in the validated set or the candidate positions 360 according to the placement scores. In some embodiments, the robotic system 100 can track the candidate positions 360 using a heap structure. Accordingly, the robotic system 100 can remove positions from the heap structures when the positions violate constraints as described above. Further, the robotic system 100 can sequence or rank the tracked positions according to the corresponding placement scores. In some embodiments, the robotic system 100 can continuously sequence the tracked positions as the placement scores or iterative updates of the scores are being computed. As a result, the robotic system 100 can select the position at the designated location (e.g., first slot) in the heap structure as the placement location 350 when the score computations conclude.

At block 714, the robotic system 100 can place the target object 112 at the derived placement location 350. In placing the target object 112 at the placement location 350, one or more components/devices of the robotic system 100 can communicate with and/or operate other components/devices. For example, one or more of the processors 202 and/or a stand-alone controller (such as, e.g., a warehouse/shipping center control device) can send information, such as the placement location 350, a corresponding motion plan, a set of commands and/or settings for operating the actuation devices 212 of FIG. 2 and/or the transport motor 214 of FIG. 2, or a combination thereof, to the other components/devices. The other components/devices, such as other instances of the processors 202 and/or the robotic arm 502 of FIG. 5, the actuation devices 212, the transport motor 214, and/or other external devices/systems, can receive the information and execute corresponding functions to manipulate (e.g., grip and pick up, transfer and/or reorient across space, place at destination, and/or release) the target object 112 and place it at the placement location.

In some embodiments, the robotic system 100 can update or re-identify real-time packaging conditions after placing the target object 112. In other words, following block 714, the control flow can move to block 702. Accordingly, the robotic system 100 can update/identify the next incoming object as the target object 112. The robotic system 100 can also update information for placement area 340 and/or the previously placed objects 508 thereon to include the recently placed object. In other embodiments, the robotic system 100 can recalculate or adjust the packing plan and/or resume according to the packing plan after placing the target object 112.

Discretization of the tasks and the 2D/3D layering described above provides improved efficiency, speed, and accuracy for packing objects. Accordingly, the reduction in operator inputs and the increase in accuracy can further decrease human labor for the automated packing process. In some environments, the robotic system 100 as described above can eliminate the necessity of sequencing buffers, which can cost around or over $1 million US.

Further, the dynamic computation of the placement location 350 according to real-time conditions (e.g., as represented by the sensor data and other status/data) provides reduced operational errors. As described above, the robotic system can account for and resolve uncertainties introduced by unexpected conditions/events without requiring human intervention. Moreover, the embodiments described above can stack the objects in 3D without a pre-existing packing plan, such as by dynamically deriving the placement locations 350 as the objects arrive at the start location 114. In comparison to traditional systems that are limited to 2D dynamic packing (i.e., placing objects directly on the platform as a single layer), the consideration of height can allow the embodiments described above to stack the objects on top of each other and increase the packing density.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:
    determining a two-dimensional (2D) discretized object model representing a target object, wherein determining the 2D discretized object model includes discretizing source sensor data of the target object according to discretization units;
    determining a 2D discretized model representing a placement area associated with a task location and/or with previously placed objects at the task location, wherein determining the discretized model includes discretizing destination sensor data of the task location according to further discretization units;
    determining height measures representing heights within portions of the placement area, wherein determining the height measures includes discretizing the destination sensor data according to one or more sets of the further discretization units;
    deriving a candidate position for placing the target object by overlapping the 2D discretized object model over the 2D discretized model at a corresponding location;
    selecting the candidate position as a placement location for placing the target object at the task location; and
    communicating information for placing the target object at the placement location.

2. The method of claim 1, wherein determining the 2D discretized object model includes:
    identifying an object type based on the source sensor data, wherein the object type represents an identity of the target object; and
    accessing the 2D discretized object model based on searching master data according to the object type.

3. The method of claim 1, wherein determining the 2D discretized object model includes:
    estimating one or more lengths based on the source sensor data, wherein the one or more lengths represent one or more dimensions of the target object;
    accessing the 2D discretized object model based on searching master data according to the one or more lengths.

4. The method of claim 1, wherein determining the 2D discretized object model includes generating the 2D discretized object model in real time directly in response to capturing or receiving the source sensor data, wherein the 2D discretized object model is generated based on overlaying the discretization units over an area representative of the target object according to the source sensor data.

5. The method of claim 1, wherein determining the height measures includes determining the height measures for the one or more sets of the further discretization units overlapped by the 2D discretized object model for one or more of the candidate positions.

6. The method of claim 1, further comprising:
    identifying a maximum height for the candidate position, wherein the maximum height represents a highest instance of the height measures for the candidate position;
    calculating a lower height limit based on a height difference threshold and the maximum height;
    identifying supporting locations based on comparing the height measures to the lower height limit, wherein the supporting locations include instances of the further discretization units where the height measures match and/or exceed the lower height limit.

7. The method of claim 6, further comprising:
    dynamically validating the candidate position according to one or more placement constraints associated with the height measures; and
    calculating at least one placement score for the validated candidate position,
    wherein:
        dynamically validating the candidate position and/or calculating the placement score includes evaluating the candidate position according to the supporting locations.

8. The method of claim 7, wherein dynamically validating the candidate position includes:
    calculating a qualifying count representing a quantity of the supporting locations; and
    dynamically validating the candidate position based on comparing the qualifying count for the candidate position to a threshold.

9. The method of claim 7, wherein dynamically validating the candidate position includes:
    deriving support area outlines based on edges and/or corners of outermost instances of the supporting locations, and
    calculating a support area size based on the support area outlines, wherein the support area size represents a quantity of the discretization units within the support area outlines; and
    dynamically validating the candidate position based on comparing the support area size for the candidate position to a threshold.

10. The method of claim 7, wherein dynamically validating the candidate position includes:
    deriving support area outlines based on edges and/or corners of outermost instances of the supporting locations; and
    comparing a center-of-mass (CoM) location associated with the 2D discretized object model with the support area outlines.

11. The method of claim 7, wherein dynamically validating the candidate position includes deriving approach paths for placing the target object at the candidate position.

12. The method of claim 7, wherein calculating the at least one placement score includes:
    calculating a first placement score for the candidate position based on a qualifying count, a support area size, a center-of-mass (CoM) location, an approach path, or a combination thereof; and/or calculating a second placement score for the candidate position based on a resulting height, a proximity measure, and edge-placement status, a maximum supportable weight, and object type, a supported weight ratio, or a combination thereof.

13. The method of claim 1, further comprising dynamically deriving the placement location in response to one or more uncertainty factors.

14. The method of claim 13, wherein the one or more uncertainty factors are associated with an absence of a packing plan, the packing plan is for representing placement locations derived for a set of objects, including the target object, at the task location.

15. The method of claim 13, wherein the one or more uncertainty factors are associated with one or more deviations from a packing plan, the packing plan is for representing placement locations derived for a set of objects, including the target object, at the task location.

16. The method of claim 15, wherein the one or more uncertainty factors are associated with a source matching error from comparing the source sensor data to master data, a sequence associated with the packing plan, or a combination thereof.

17. The method of claim 15, wherein the one or more uncertainty factors are associated with a destination matching error from comparing the destination sensor data to the packing plan.

18. The method of claim 15, wherein the one or more uncertainty factors are associated with a collision event, an object-loss event, an object-shift event, or a combination thereof.

19. A robotic system comprising:
at least one processor; and
at least one memory device connected to the at least one processor and having stored thereon instructions executable by the processor to:
    determine a two-dimensional (2D) discretized object model representing a target object, wherein determining the 2D discretized object model includes discretizing object sensor data of the target object according to discretization units;
    determine a 2D discretized model representing a destination area, wherein determining the 2D discretized model includes discretizing destination sensor data of the destination area according to further discretization units;
    determine height measures representing maximum heights within portions of the destination area, wherein determining the height measures includes discretizing the destination sensor data according to one or more sets of the further discretization units; and
    derive a candidate position for placing the target object at the destination area.

20. A tangible, non-transient computer-readable medium having processor instructions stored thereon that, when executed by a robotic system via one or more processors thereof, cause the robotic system to perform a method, the instructions comprising:
    instructions to determine a two-dimensional (2D) discretized object model representing a target object, wherein the instructions to determine the 2D discretized object model include instructions to discretize source sensor data of the target object according to discretization units;
    instructions to determine a 2D discretized model representing a task location, wherein the instructions to determine the 2D discretized model include instructions to discretize destination sensor data of the task location according to further discretization units;
    instructions to determine height measures representing maximum heights within portions of a placement area associated with the task location, wherein the instruction to determine the height measures include instructions to discretize the destination sensor data according to one or more sets of the further discretization units;
    instructions to derive a candidate position for placing the target object based at least in part on the 2D discretized object model and the 2D discretized model;
    instructions to select the candidate position as a placement location for placing the target object at the task location; and
    instructions to communicate information for placing the target object at the placement location.

* * * * *